US011561909B2

(12) United States Patent
Hahn et al.

(10) Patent No.: US 11,561,909 B2
(45) Date of Patent: Jan. 24, 2023

(54) BANDWIDTH ALLOCATION FOR STORAGE SYSTEM COMMANDS IN PEER-TO-PEER ENVIRONMENT

(71) Applicant: Western Digital Technologies, Inc., San Jose, CA (US)

(72) Inventors: Judah Gamliel Hahn, Ofra (IL); Shay Benisty, Beer Sheva (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 85 days.

(21) Appl. No.: 17/243,348

(22) Filed: Apr. 28, 2021

(65) Prior Publication Data

US 2022/0350755 A1 Nov. 3, 2022

(51) Int. Cl.
*G06F 13/42* (2006.01)
*G06F 13/16* (2006.01)
*G06F 9/46* (2006.01)

(52) U.S. Cl.
CPC .......... *G06F 13/161* (2013.01); *G06F 9/467* (2013.01); *G06F 13/1642* (2013.01); *G06F 13/1668* (2013.01); *G06F 13/4221* (2013.01); *G06F 2213/0026* (2013.01)

(58) Field of Classification Search
CPC ............ G06F 13/161; G06F 13/16142; G06F 13/1668; G06F 13/4221; G06F 9/467; G06F 2213/0026
USPC ........................................................ 711/167
See application file for complete search history.

(56) References Cited

U.S. PATENT DOCUMENTS

| | | | |
|---|---|---|---|
| 6,119,176 A * | 9/2000 | Maruyama | G06F 13/28 710/39 |
| 6,728,808 B1 * | 4/2004 | Brown | G06F 13/423 710/110 |
| 7,913,024 B2 | 3/2011 | Brown et al. | |
| 8,171,230 B2 | 5/2012 | Freimuth et al. | |
| 9,304,690 B2 | 4/2016 | McCambridge et al. | |
| 9,563,382 B2 | 2/2017 | Hahn et al. | |
| 9,798,636 B2 | 10/2017 | Breakstone et al. | |
| 10,031,857 B2 | 7/2018 | Menachem et al. | |
| 10,120,832 B2 | 11/2018 | Raindel et al. | |
| 10,318,164 B2 | 6/2019 | De | |
| 10,564,857 B2 | 2/2020 | Benisty et al. | |

(Continued)

*Primary Examiner* — Christopher B Shin
(74) *Attorney, Agent, or Firm* — Vierra Magen Marcus LLP

(57) ABSTRACT

Technology is disclosed for allocating PCIe bus bandwidth to storage commands in a peer-to-peer environment. A non-volatile storage system has a peer-to-peer connection with a host system and a target device, such as a GPU. A memory controller in the storage system monitors latency of PCIe transactions that are performed over a PCIe bus in order to transfer data for NVMe commands. The PCIe transactions may involve direct memory access (DMA) of memory in the host system or target device. There could be a significant difference in transaction latency depending on what memory is being accessed and/or what communication link is used to access the memory. The memory controller allocates bandwidth on a PCIe bus to the NVMe commands based on the latencies of the PCIe transactions. In an aspect, the memory controller groups the PCIe addresses based on the latencies of the PCIe transactions.

19 Claims, 14 Drawing Sheets

(56) References Cited

U.S. PATENT DOCUMENTS

| | | |
|---|---|---|
| 10,712,949 B2 | 7/2020 | Hahn et al. |
| 10,732,895 B2 | 8/2020 | Earhart et al. |
| 10,860,333 B1* | 12/2020 | Benisty ................. G06F 9/4411 |
| 10,877,913 B2 | 12/2020 | Elkington et al. |
| 11,086,813 B1* | 8/2021 | Schuette ............. G06F 13/4022 |
| 2010/0165874 A1 | 7/2010 | Brown et al. |
| 2015/0095555 A1* | 4/2015 | Asnaashari ......... G06F 12/0246 |
| | | 711/114 |
| 2015/0189121 A1* | 7/2015 | Shinya ............... H04N 1/00095 |
| | | 358/1.13 |
| 2016/0147442 A1 | 5/2016 | Baderdinni et al. |
| 2016/0274821 A1* | 9/2016 | Park ...................... G06F 13/102 |
| 2017/0262380 A1* | 9/2017 | Yoshida ............. G06F 13/4068 |
| 2021/0026559 A1* | 1/2021 | Richter ................. G06F 3/0611 |
| 2021/0038994 A1* | 2/2021 | Colenbrander ....... G06F 13/122 |
| 2021/0117334 A1* | 4/2021 | Guim Bernat ...... G06F 12/0835 |
| 2022/0283962 A1* | 9/2022 | Hwang .................. G06F 13/18 |

\* cited by examiner

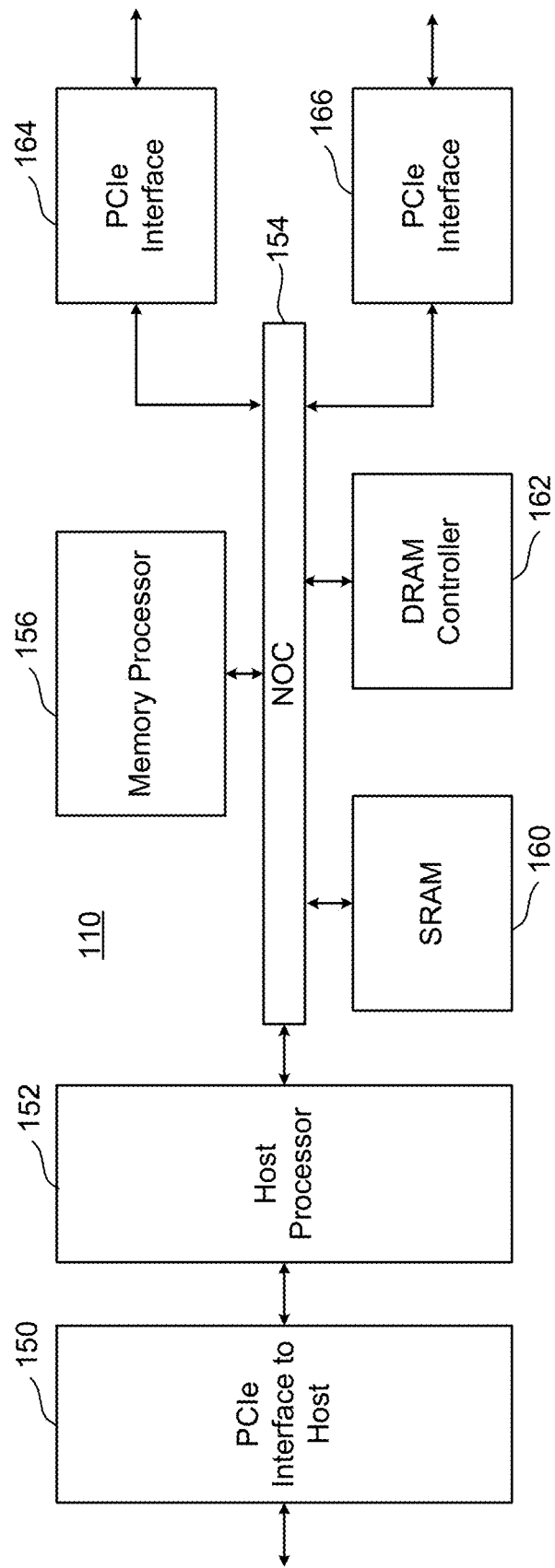

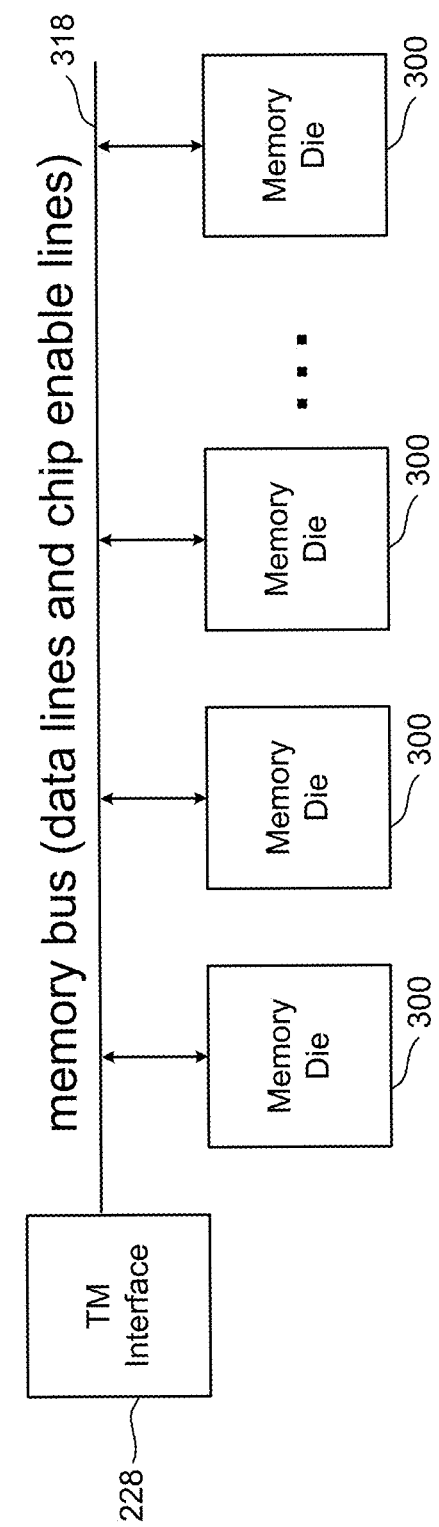

| Addresses | Latency | Cost |
|---|---|---|
| PRP List Addresses | Shortest Latency | Lowest Cost |
| ... | ... | ... |
| PRP List Addresses | Longest Latency | Highest Cost |

1000

```
Memory controller issues PCIe transaction to read data
from memory of PCIe device (DMA using PCIe address)          ~1002
                          ↓
Memory controller records time of the PCIe transaction
(latency)                                                    ~1004
                          ↓
                     ◇ 1006
        Yes ← More measurements?
                          ↓ No
Memory controller records mapping of the PCIe
addresses to latencies                                       ~1008
```

| Data Buffer Address Grouping | Cost |
|---|---|
| List of addresses with latency L1 or faster | Lowest Cost |
| List of addresses having latency between L1 and L2 | $2^{nd}$ Lowest Cost |
| List of addresses having latency between L2 and L3 | $3^{rd}$ Lowest Cost |
| List of addresses having latency greater than L3 | Highest Cost |

| I/O Submission Queue Data Buffer Grouping | Cost |
|---|---|
| Latency of Data Buffer Access for I/O Submission Queue 1 | Cost to access Data Buffers for Queue 1 |
| Latency of Data Buffer Access for I/O Submission Queue 1 | Cost to access Data Buffers for Queue 2 |
| ... | ... |
| Latency of Data Buffer Access for I/O Submission Queue n | Cost to access Data Buffers for Queue n |

FIG. 10C

BANDWIDTH ALLOCATION FOR STORAGE SYSTEM COMMANDS IN PEER-TO-PEER ENVIRONMENT

BACKGROUND

The present technology relates to the operation of non-volatile memory systems.

One type of non-volatile storage is semiconductor memory. For example, non-volatile semiconductor memory is used in solid state drives, mobile computing devices, non-mobile computing devices and other memory systems. Typically, the memory system has a controller which controls data transfers between the memory system and a host system over a communication interface. The host system could be computer system, cellular telephone, server, etc. The memory system and host system may exchange data over, for example, a Peripheral Computer Interface Express (PCIe) bus. Non-volatile Memory Express (NVMe) is a logical device interface specification for accessing non-volatile storage attached via a PCIe bus. NVMe takes advantage of parallelism offered by semiconductor memory such as, but not limited to, solid state drives.

To execute an NVMe command, the memory system may perform a direct memory access (DMA) of memory in the host system. For example, for an NVMe write command the memory controller may access data from write data buffers in the host memory. For an NVMe read command the memory controller may store data to read data buffers in the host memory. The memory controller may also access other areas in the host memory for control information. For example, the memory controller may access NVMe commands from an I/O (Input/Output) submission queue in host memory.

In addition to the host system, the memory controller may access memory of another electronic device, such as a graphics processing unit (GPU), in order to complete an NVMe command. For example, it is possible that the data buffers are in GPU memory. Hence, the memory controller may directly access the GPU memory in order to complete an NVMe command.

The host system, the GPU, and the memory system may be connected to the same communication bus, such as a PCIe bus. Hence, the memory controller may issue, for example, PCIe transactions in order to access the host memory and the GPU memory. The latency for PCIe transactions destined for the GPU memory could be different from the latency for PCIe transactions destined for the host processor. When PCIe bus utilization is high, such differences in latency can result in poor utilization of the PCIe bus. Also, it is possible for bottlenecks to occur as a result of a mix of PCIe transactions to the host memory and GPU memory. For example, there could be collisions in data buffers of a PCIe root complex.

BRIEF DESCRIPTION OF THE DRAWING

Like-numbered elements refer to common components in the different figures.

FIG. 1B is a block diagram of one embodiment of a Front-End Processor Circuit.

FIG. 2B is a block diagram of one embodiment of a memory package.

FIG. 10A is a flowchart of one embodiment of a process of monitoring latencies of DMAs of data for an NVMe write command.

FIG. 10B depicts an embodiment of a table that maps PCIe addresses to latency.

FIG. 10C depicts another embodiment of a table that maps PCIe addresses to latency.

DETAILED DESCRIPTION

The technology described herein pertains to allocating communication bus bandwidth to storage commands that are used access non-volatile memory in a non-volatile storage system. In an embodiment, PCIe bus bandwidth is allocated to NVMe commands in a peer-to-peer PCIe environment. The non-volatile storage system may have a peer-to-peer connection with a host system and a target device. The host system may be an NVMe host, which is a system that is able to issue NVMe commands to the storage system. The host system might have a central processing unit (CPU). The target device might be, for example, a graphics processing unit (GPU). In an embodiment, the host system is a NVMe host, and the GPU is an NVMe co-host. An NVMe co-host is able to issue NVMe commands to the storage system. For the sake of discussion, examples will be discussed herein in which the peer-to-peer PCIe environment has a CPU which acts as an NVMe host and a GPU which may be, but is not required to be, an NVMe co-host.

In an embodiment, a memory controller in the non-volatile storage system monitors latency of PCIe transactions that are performed in order to transfer data for the NVMe commands. The PCIe transactions may involve direct memory access (DMA) of memory in the CPU or GPU. Each PCIe transaction has an address in a PCIe bus address space. In an embodiment, the memory controller groups the PCIe addresses based on the latencies of the PCIe transactions. The memory controller may then allocate PCIe bus bandwidth to NVMe commands based on the latencies of PCIe transactions that are performed to transfer data associated with the NVMe commands.

There could be a significant difference in transaction latency depending on what memory is being accessed and/or what communication link is used to access the memory. The memory controller allocates PCIe bus bandwidth to the NVMe commands based on the latencies of the PCIe transactions. For example, PCIe transactions having a higher latency could be held off, at least temporarily, in favor of PCIe transactions haver a lower latency. Therefore, the memory controller make good use of the PCIe bandwidth, especially when PCIe bus utilization is high.

Moreover, it is possible for bottlenecks to occur as a result of a mix of PCIe transactions to the host memory and GPU memory. For example, there could be collisions in data buffers of a PCIe root complex. Allocating PCIe bandwidth to NVMe commands based on the latencies of PCIe transactions reduces or eliminates collisions in data buffers of the PCIe root complex. Hence, bottlenecks on the PCIe bus are reduced or eliminated.

FIG. 1A-FIG. 4B describe one example of a storage system that can be used to implement the technology disclosed herein.

Figure 1A:
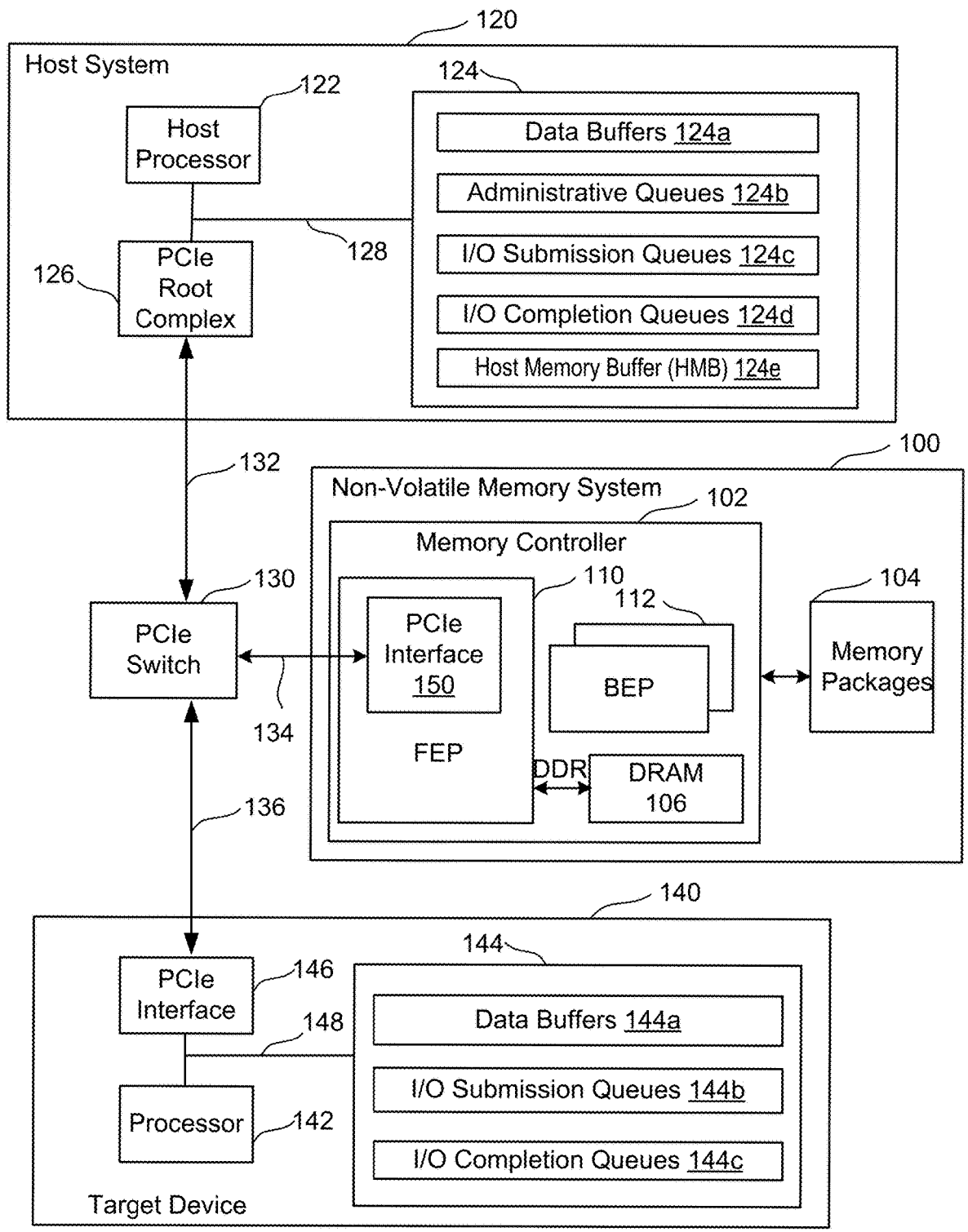
FIG. 1A is a block diagram of one embodiment of a storage system connected to a host system and a target device.

FIG. 1A is a block diagram of one embodiment of a storage system 100 connected to a host system 120 and a target device 140 by way of a communication bus. In an embodiment, the communication bus is a PCIe bus. The storage system 100 has a memory controller 102 and memory packages 104, which contain non-volatile memory. In one embodiment, the target device 140 is a graphics processing unit (GPU). However, the target device 140 is not required to be a GPU. In one embodiment, the target device 140 is an NVMe co-host, which means that it is able to issue NVMe storage commands to the storage system 100. Hence, the target device 140 may, in certain contexts, be referred to as a co-host or NVMe co-host. There may be more than one target device 140. In general, the host system 120 and target device 140 may each be referred to as an electronic device connected to a communication bus (e.g., PCIe bus).

In an embodiment, the storage system 100 communicates with host system 120 and target device 140 over a PCIe communication bus. In an embodiment, there is a first PCIe link between the storage system 100 and the host system 120, a second PCIe link between the storage system 100 and the target device 140, and a third PCIe link between the host system 120 and the target device 140. The host system 120 has a PCIe root complex 126. The PCIe root complex may contain a root port. However, the PCIe root complex 126 could be outside of the host system 120. In an embodiment, PCIe switch 130 communicatively couples the storage system 100 and the target device 140 to the host system 120 by way of PCIe root complex 126 in the host system 120. A PCIe switch is a device that connects two or more PCIe links. However, the PCIe switch 130 is not required. On the other hand, there could be more than one PCIe switch 130.

In an embodiment, the storage system 100, the host system 120, and target device 140 are each PCIe devices. In an embodiment, the storage system 100 is a first PCIe endpoint device and the target device 140 is a second PCIe endpoint device. Connection 132 between the PCIe switch 130 and PCIe root complex 126 may be a PCIe based interface. Connection 134 between the PCIe switch 130 and PCIe interface 150 in the storage system 100 may also be a PCIe based interface. Connection 136 between the PCIe switch 130 and PCIe interface 146 in the target device 140 may also be a PCIe based interface. However, connections 134 and 136 may support fewer lanes than connection 132. For example, connection 132 may support 32 lanes, whereas connections 134 and 136 may each support eight lanes.

In an embodiment, host system 120 issues storage commands to the memory controller 102 in the storage system 100 to access (e.g., read, write) non-volatile memory in the memory packages 104. In an embodiment, the storage commands are NVMe commands. The host system 120 has the ability to make direct requests for transfers to/from memory packages 104. In an embodiment, the host system 120 acts as a host in the NVMe specification to send storage commands to the memory controller 102. Hence, in an embodiment, NVMe over PCIe is used.

In an embodiment, target device 140 issues storage commands (e.g., NVMe commands) to the memory controller 102 to access (e.g., read, write) non-volatile memory in the memory packages 104. In an embodiment, the storage system 100 and target device 140 have a peer-to-peer connection. The peer-to-peer connection allows the target device 140 to make direct requests for transfers to/from memory packages 104. In an embodiment, the target device 140 acts as a co-host to send NVMe storage commands to the memory controller 102, in which case target device 140 may be referred to as a co-host or NVMe co-host. The target device 140, in one embodiment, is a GPU.

The host system 120 has host processor 122, host memory 124, PCIe root complex 126, and bus 128. Host memory 124 is the host's physical memory, and can be DRAM, SRAM, non-volatile memory, or another type of storage. Host system 120 is external to and separate from storage system 100. In one embodiment, storage system 100 is embedded in host system 120.

The host memory 124 may be used for various data buffers and queues that are known in the NVMe protocol. The NVMe Specification defines a command interface based on Administrative Queues (e.g., 124*b*), I/O Submission Queues (e.g., 124*c*), and I/O Completion Queues (e.g., 124*d*). Administrative queues 124*b* are used for tasks such as queue creation and deletion, device status interrogation and feature configuration. I/O queues are used for all storage-related transfers, such as reads and writes. For example, the host system 120 places NVMe commands on an I/O submission queue 124*c* to instruct the memory controller 102 to read or write the non-volatile memory 104. The memory controller 102 places a command completion message in an I/O completion queue 124*d* upon completion of the NVMe command.

Data buffers 124*a* may be used to store data to be written to non-volatile memory 104 or to store data that was read from non-volatile memory 104. The memory controller 102 may perform a DMA of data from data buffers 124*a* when writing data to non-volatile memory 104. The memory controller 102 may perform a DMA of data to data buffers 124*a* when reading data from non-volatile memory 104.

The host memory buffer (HMB) 124*e* is a region of host memory 124 that is provided for exclusive use of the storage system 100. As an example, the memory controller 102 might use the HMB 124*e* to store a host logical address to physical address translation table (or portion thereof). The physical address is the address in non-volatile memory 104 that corresponds to the host logical address. Hence, the memory controller 102 might need to access the HMB 124*e* in order to execute an NVMe command that specifies a host logical address.

The target device 140 has a processor 142, target device memory 144, PCIe interface 146, and bus 148. target device memory 144 is the PCIe device's physical memory, and can be DRAM, SRAM, non-volatile memory, or another type of storage. target device 140 is external to and separate from storage system 100. In one embodiment, target device 140 is a GPU.

In an embodiment, target device memory 144 is used for data buffers 144a and/or I/O queues 144b, 144c. In an embodiment, the target device 140 uses the I/O command queues 144b to issue NVMe storage commands to the storage system 100. The storage system 100 may write command completion status to the I/O completion queues 144c. In an embodiment, the host system 120 may create the I/O queues 144b, 144c in the target device 140. The storage for such I/O queues can be a range of memory within an allocated Base Address Register (BAR) spare of target device 140. BAR spaces are PCIe memory regions assigned by the PCI enumerator at device initialization time, and are accessible to all devices on a PCIe fabric. After queue creation, host system 120 can communicate memory allocation details to target device 140. target device 140 may then execute NVME commands autonomously of host system 120 using the NVMe protocol. According to some embodiments, the queue memory allocation information can be determined by the target device 140 and transmitted from target device 140 to host system 120. Further details of a host system establishing NVMe queues on a co-host are described in U.S. Pat. No. 9,304,690, entitled "System and Method for Peer-to-Peer PCIe Storage Transfers," which is hereby incorporated by reference.

Data buffers 144a in target device memory 144 may be used to store data to be written to non-volatile memory 104 or to store data that was read from non-volatile memory 104. The memory controller 102 may perform a DMA of data from data buffers 144a when writing data to non-volatile memory 104. The memory controller 102 may perform a DMA of data to data buffers 144a when reading data from non-volatile memory 104.

The use of target device memory 144 is one example, but other possibilities exist. Optionally, the target device memory 144 may be used to store an HMB. It is not required that the target device 140 have both the I/O queues 144b, 144c and the data buffers 144a. In one embodiment, the target device 140 has data buffers 144a, but not the I/O queues 144b, 144c. In this case, the target device 140 does not necessarily operate as an NVMe co-host. That is, the target device 140 need not issue NVMe commands to the storage system 100.

In an embodiment, the storage system 100 uses direct memory access (DMA) to access the host memory 124 and the target device memory 144. The storage system 100 communicates with the other PCIe devices using a common address space. In an embodiment, the storage system 100 communicates with the host system 120 and target device 140 using a PCIe address space. Each PCIe device may be assigned a range of addresses in the PCIe address space. However, the internal (or local) memory addresses used by the PCIe devices may be different from the PCIe address space. Hence, there is typically a need to translate between the PCIe address space and the internal memory addresses.

The PCIe root complex 126 provides address translation services in order to redirect DMA transactions from one peer to another as needed, without the need for a buffer within the host memory 124. For example, when the storage system 100 issues a transaction on a PCIe link to access memory in either the host system 120 or the target device 140, the storage system 100 includes an address in the PCIe address space in a packet that it transmits on a PCIe link. The PCIe root complex 126 performs PCIe address translation upon receiving the packet. That is, the PCIe root complex 126 translates the PCIe address in the transaction from the storage system 100 to a physical (or internal) address in the target (e.g., host system 120, target device 140). However, the PCIe root complex 126 itself has limited buffer space. Hence, it is possible for there to be collisions between PCIe transactions. Such collisions can slow the data transfer rate between the storage system 100 and other PCIe devices (e.g., host 120, target device 140). In an embodiment, the memory controller 102 allocates PCIe bus bandwidth to NVMe commands based on latencies of PCIe transactions, which reduces or eliminates such collisions. Hence, the data transfer rate between the storage system 100 and other PCIe devices is increased.

To execute a single NVMe command the memory controller 102 may need to access several different regions in host memory 124 and/or target device memory 144. For example, the memory controller 102 might need to access an I/O submission queue (124c or 144b), the HMB 124e, data buffers (124a or 144a), and an I/O completion queue (124e or 144c) to execute a single read or write command. Hence, several PCIe transactions may be needed. There is a certain order in which these PCIe transactions for a given NVMe need to be performed. Moreover, one PCIe transaction may depend on another. For example, the memory controller 102 might first need to access host memory 124 to obtain a pointer to a data buffer that stores data to be written to non-volatile memory 104 for an NVMe write command. Hence, a high latency to obtain the data buffer pointer will impact the DMA of data from the data buffer.

The NVMe protocol does not segregate PCIe addresses or mark them in any special way. Hence, the PCIe translated addresses may look the same to the memory controller 102 as direct physical addresses in host memory 124 or target device memory 144. Also, NVMe transactions occur at a logical layer above PCIe. Hence, the ordering and dependency requirements in NVMe are not reflected in the PCIe layer. In some embodiments, the memory controller 102 monitors latencies of PCIe transactions. Based on the latencies, the memory controller 102 allocates PCIe bus bandwidth to NVMe commands. Hence, by taking into account the different PCIe transactions that may be needed to execute an NVMe command, the memory controller 102 is able to increase throughput on the PCIe bus. Also collisions in the PCIe root complex 126 are reduced or eliminated.

Storage system 100 can implement the technology disclosed herein. Many different types of storage systems can be used with the technology disclosed herein. One example storage system is a solid-state drive ("SSD"); however, other types of storage systems can also be used. Storage system 100 comprises a memory controller 102, memory package 104 for storing data, and local memory (e.g. DRAM/ReRAM) 106. Memory controller 102 comprises a Front-End Processor Circuit (FEP) 110 and one or more Back-End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the memory controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory package 104 at the request of FEP circuit 110. For example, the BEP circuit 112 can carry out the read, erase, and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Memory controller 102 is one example of a control circuit.

In one embodiment, there are a plurality of memory packages 104. Each memory package 104 may contain one or more memory dies. In one embodiment, each memory die in the memory package 104 utilizes NAND flash memory (including two-dimensional NAND flash memory and/or three-dimensional NAND flash memory). In other embodiments, the memory package 104 can include other types of memory; for example, the memory package can include Phase Change Memory (PCM) memory.

FIG. 1B is a block diagram of one embodiment of FEP circuit 110. FIG. 1B shows a PCIe interface 150 to communicate with host system 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use un-clocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, memory controller 102 includes two BEP circuits 112; therefore, there are two PCIe Interfaces 164/166. Each PCIe Interface communicates with one of the BEP circuits 112. In other embodiments, there can be more or fewer than two BEP circuits 112; therefore, there can be more than two PCIe Interfaces.

Figure 2A:
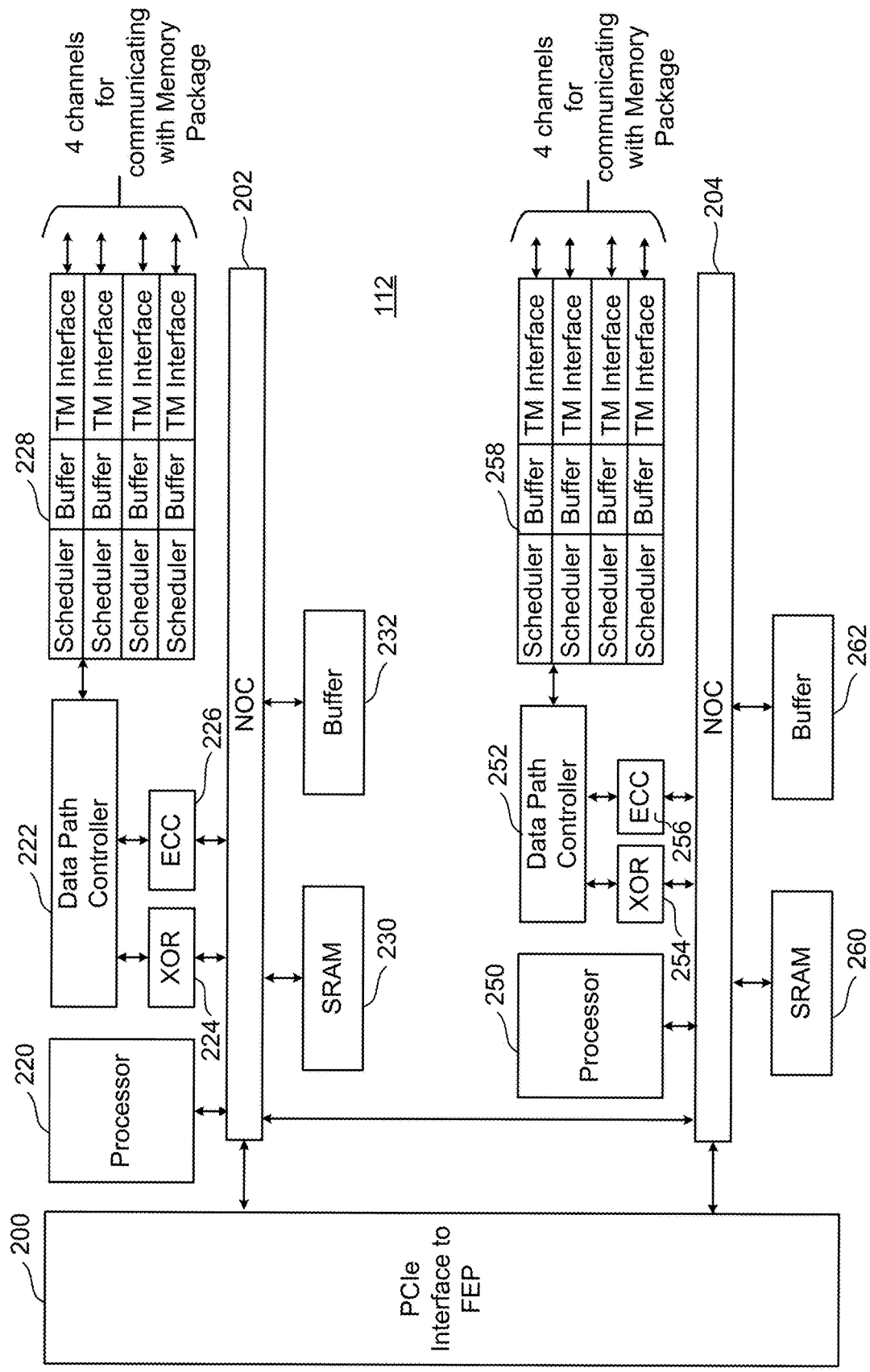
FIG. 2A is a block diagram of one embodiment of a Back-End Processor Circuit.

FIG. 2A is a block diagram of one embodiment of the BEP circuit 112. FIG. 2A shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254), an ECC engine (226/256).

The ECC engines 226/256 are used to perform error correction, as known in the art. Herein, the ECC engines 226/256 may be referred to as controller ECC engines. The XOR engines 224/254 are used to XOR the data so that data can be combined and stored in a manner that can be recovered in case there is a programming error. In an embodiment, the XOR engines 224/254 can recover data that cannot be decoded using ECC engine 226/256.

Data path controller 222 is connected to a memory interface 228 for communicating via four channels with integrated memory assemblies. Thus, the top NOC 202 is associated with memory interface 228 for four channels for communicating with integrated memory assemblies and the bottom NOC 204 is associated with memory interface 258 for four additional channels for communicating with integrated memory assemblies. In one embodiment, each memory interface 228/258 includes four Toggle Mode interfaces (TM Interface), four buffers and four schedulers. There is one scheduler, buffer, and TM Interface for each of the channels. The processor can be any standard processor known in the art. The data path controllers 222/252 can be a processor, FPGA, microprocessor, or other type of controller. The XOR engines 224/254 and ECC engines 226/256 are dedicated hardware circuits, known as hardware accelerators. In other embodiments, the XOR engines 224/254, ECC engines 226/256 can be implemented in software. The scheduler, buffer, and TM Interfaces are hardware circuits. In other embodiments, the memory interface (an electrical circuit for communicating with memory dies) can be a different structure than depicted in FIG. 2A. Additionally, controllers with structures different than FIGS. 1B and 2A can also be used with the technology described herein.

FIG. 2B is a block diagram of one embodiment of a memory package 104 that includes a plurality of memory dies 300 connected to a memory bus (data lines and chip enable lines) 318. The memory bus 318 connects to a Toggle Mode Interface 228 for communicating with the TM Interface of a BEP circuit 112 (see e.g., FIG. 2A). In some embodiments, the memory package can include a small controller connected to the memory bus and the TM Interface. In total, the memory package 104 may have eight or 16 memory die; however, other numbers of memory die can also be implemented. The technology described herein is not limited to any particular number of memory die. In some embodiments, the memory package can also include a processor, CPU device, such as a RISC-V CPU along with some amount of RAM to help implement some of capabilities described below. The technology described herein is not limited to any particular number of memory die.

Figure 3A:
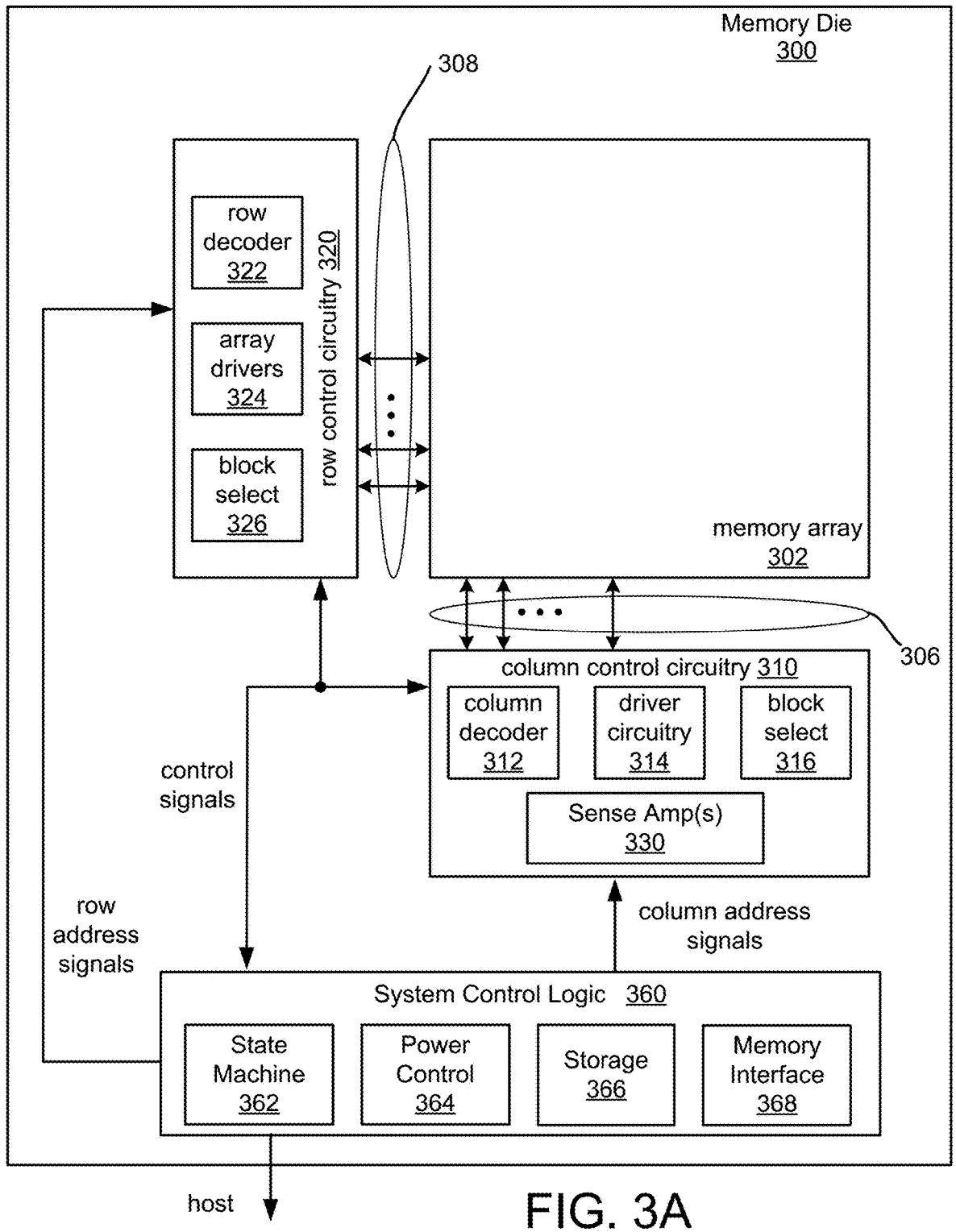
FIG. 3A is a functional block diagram of an embodiment of a memory die.

FIG. 3A is a block diagram that depicts one example of a memory die 300 that can implement the technology described herein. Memory die 300, which can correspond to one of the memory die 300 of FIG. 2B, includes a memory array 302 that can include any of memory cells described in the following. The array terminal lines of memory array 302 include the various layer(s) of word lines organized as rows, and the various layer(s) of bit lines organized as columns. However, other orientations can also be implemented. Memory die 300 includes row control circuitry 320, whose outputs 308 are connected to respective word lines of the memory array 302. Row control circuitry 320 receives a group of M row address signals and one or more various control signals from System Control Logic circuit 360, and typically may include such circuits as row decoders 322, array terminal drivers 324, and block select circuitry 326 for both reading and writing operations. Row control circuitry 320 may also include read/write circuitry. Memory die 300 also includes column control circuitry 310 including sense amplifier(s) 330 whose input/outputs 306 are connected to respective bit lines of the memory array 302. Although only single block is shown for array 302, a memory die can include multiple arrays that can be individually accessed. Column control circuitry 310 receives a group of N column address signals and one or more various control signals from System Control Logic 360, and typically may include such circuits as column decoders 312, array terminal receivers or drivers 314, block select circuitry 316, as well as read/write circuitry, and I/O multiplexers.

System control logic 360 receives data and commands from a host and provides output data and status to the host. In other embodiments, system control logic 360 receives data and commands from a separate controller circuit and provides output data to that controller circuit, with the controller circuit communicating with the host. In some embodiments, the system control logic 360 can include a state machine 362 that provides die-level control of memory operations. In one embodiment, the state machine 362 is programmable by software. In other embodiments, the state machine 362 does not use software and is completely implemented in hardware (e.g., electrical circuits). In another embodiment, the state machine 362 is replaced by a micro-controller or microprocessor, either on or off the memory chip. The system control logic 360 can also include a power control module 364 controls the power and voltages supplied to the rows and columns of the memory structure 302 during memory operations and may include charge pumps and regulator circuit for creating regulating voltages. System control logic 360 includes storage 366, which may be used to store parameters for operating the memory array 302.

Commands and data are transferred between the controller 102 and the memory die 300 via memory controller interface 368 (also referred to as a "communication interface"). Memory controller interface 368 is an electrical interface for communicating with memory controller 102. Examples of memory controller interface 368 include a Toggle Mode Interface and an Open NAND Flash Interface (ONFI). Other I/O interfaces can also be used. For example, memory controller interface 368 may implement a Toggle Mode Interface that connects to the Toggle Mode interfaces of memory interface 228/258 for memory controller 102. In one embodiment, memory controller interface 368 includes a set of input and/or output (I/O) pins that connect to the controller 102.

In some embodiments, all the elements of memory die 300, including the system control logic 360, can be formed as part of a single die. In other embodiments, some or all of the system control logic 360 can be formed on a different die.

For purposes of this document, the phrase "one or more control circuits" can include a controller, a state machine, a micro-controller, micro-processor, and/or other control circuitry as represented by the system control logic 360, or other analogous circuits that are used to control non-volatile memory.

In one embodiment, memory structure 302 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping.

In another embodiment, memory structure 302 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 302 is not limited to the examples above. Many different types of memory array architectures or memory technologies can be used to form memory structure 302. No particular non-volatile memory technology is required for purposes of the new claimed embodiments proposed herein. Other examples of suitable technologies for memory cells of the memory structure 302 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 302 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 3A can be grouped into two parts, the structure of memory structure 302 of the memory cells and the peripheral circuitry, including all of the other elements. An important characteristic of a memory circuit is its capacity, which can be increased by increasing the area of the memory die of storage system 100 that is given over to the memory structure 302; however, this reduces the area of the memory die available for the peripheral circuitry. This can place quite severe restrictions on these peripheral elements. For example, the need to fit sense amplifier circuits within the available area can be a significant restriction on sense amplifier design architectures. With respect to the system control logic 360, reduced availability of area can limit the available functionalities that can be implemented on-chip. Consequently, a basic trade-off in the design of a memory die for the storage system 100 is the amount of area to devote to the memory structure 302 and the amount of area to devote to the peripheral circuitry.

Another area in which the memory structure 302 and the peripheral circuitry are often at odds is in the processing involved in forming these regions, since these regions often involve differing processing technologies and the trade-off in having differing technologies on a single die. For example, when the memory structure 302 is NAND flash, this is an NMOS structure, while the peripheral circuitry is often CMOS based. For example, elements such sense amplifier circuits, charge pumps, logic elements in a state machine, and other peripheral circuitry in system control logic 360 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 3A onto separately formed dies that are then bonded together. More specifically, the memory structure 302 can be formed on one die and some or all of the peripheral circuitry elements, including one or more control circuits, can be formed on a separate die. For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate die. This allows each of the memory die to be optimized individually according to its technology. For example, a NAND memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one peripheral circuitry die, other embodiments can use more die, such as two memory die and one peripheral circuitry die, for example.

Figure 3B:
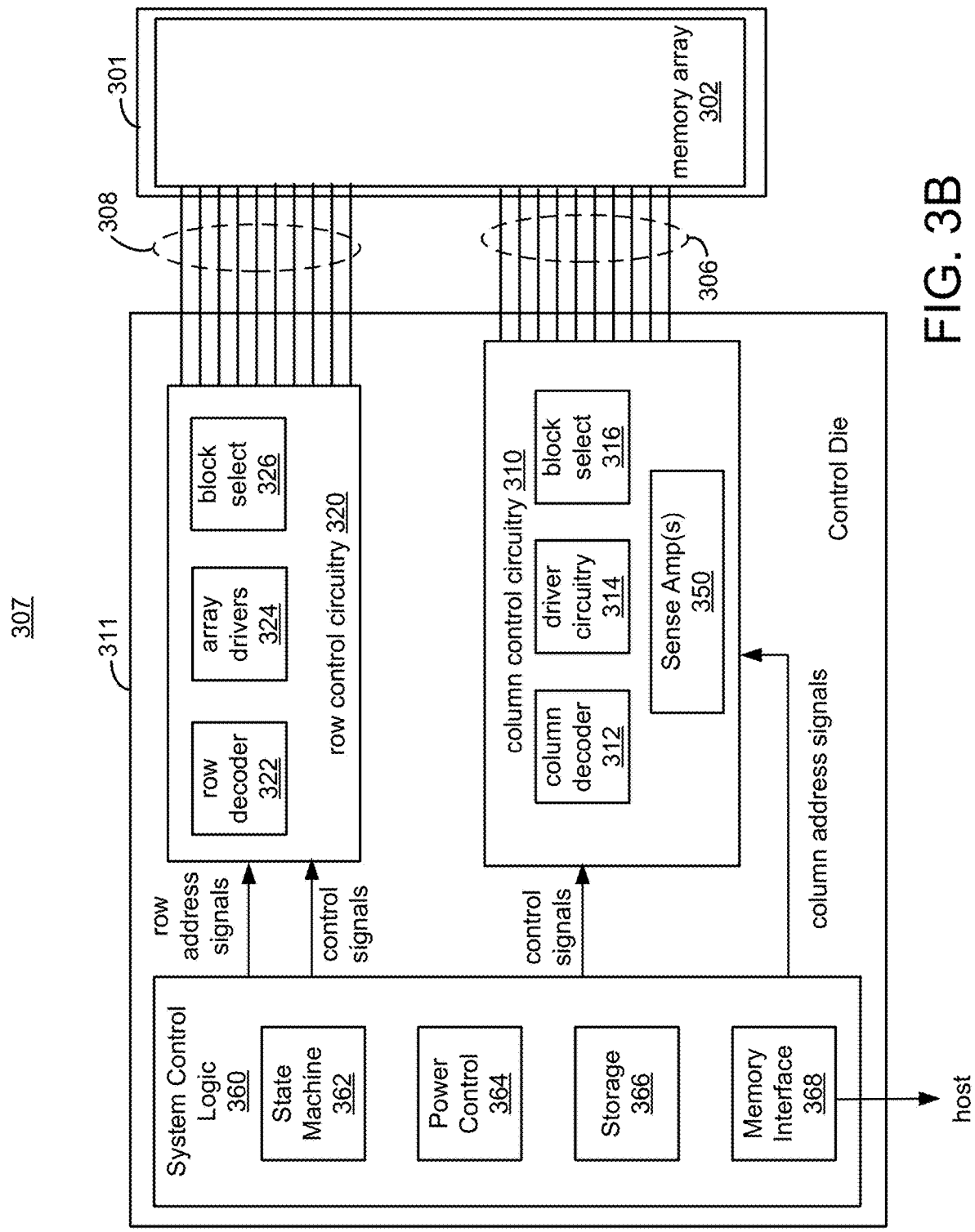
FIG. 3B is a functional block diagram of an embodiment of an integrated memory assembly.

FIG. 3B shows an alternative arrangement to that of FIG. 3A which may be implemented using wafer-to-wafer bonding to provide a bonded die pair. FIG. 3B depicts a functional block diagram of one embodiment of an integrated memory assembly 307. The integrated memory assembly 307 may be used in a memory package 104 in storage system 100. The integrated memory assembly 307 includes two types of semiconductor die (or more succinctly, "die"). Memory structure die 301 includes memory structure 302. Memory structure 302 may contain non-volatile memory cells. Control die 311 includes control circuitry 360, 310, 320. In some embodiments, the control die 311 is configured to connect to the memory structure 302 in the memory structure die 301. In some embodiments, the memory structure die 301 and the control die 311 are bonded together.

FIG. 3B shows an example of the peripheral circuitry, including control circuits, formed in a peripheral circuit or control die 311 coupled to memory structure 302 formed in memory structure die 301. Common components are labelled similarly to FIG. 3A. System control logic 360, row control circuitry 320, and column control circuitry 310 are located in control die 311. In some embodiments, all or a portion of the column control circuitry 310 and all or a portion of the row control circuitry 320 are located on the memory structure die 301. In some embodiments, some of the circuitry in the system control logic 360 is located on the on the memory structure die 301.

System control logic 360, row control circuitry 320, and column control circuitry 310 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 310). Thus, while moving such circuits from a die such as memory structure die 301 may reduce the number of steps needed to fabricate such a die, adding such circuits to a die such as control die 311 may not require any additional process steps. The control die 311 could also be referred to as a CMOS die, due to the use of CMOS technology to implement some or all of control circuitry 360, 310, 320.

FIG. 3B shows column control circuitry 310 including sense amplifier(s) 350 on the control die 311 coupled to memory structure 302 on the memory structure die 301 through electrical paths 306. For example, electrical paths 306 may provide electrical connection between column decoder 312, driver circuitry 314, and block select 316 and bit lines of memory structure 302. Electrical paths may extend from column control circuitry 310 in control die 311 through pads on control die 311 that are bonded to corresponding pads of the memory structure die 301, which are connected to bit lines of memory structure 302. Each bit line of memory structure 302 may have a corresponding electrical path in electrical paths 306, including a pair of bond pads, which connects to column control circuitry 310. Similarly, row control circuitry 320, including row decoder 322, array drivers 324, and block select 326 are coupled to memory structure 302 through electrical paths 308. Each of electrical path 308 may correspond to a word line, dummy word line, or select gate line. Additional electrical paths may also be provided between control die 311 and memory structure die 301.

For purposes of this document, the phrase "a control circuit" can include one or more of memory controller 102, system control logic 360, column control circuitry 310, row control circuitry 320, a micro-controller, a state machine, and/or other control circuitry, or other analogous circuits that are used to control non-volatile memory. The control circuit can include hardware only or a combination of hardware and software (including firmware). For example, a memory controller programmed by firmware to perform the functions described herein is one example of a control circuit. A control circuit can include a processor, FGA, ASIC, integrated circuit, or other type of circuit.

Figure 4A:
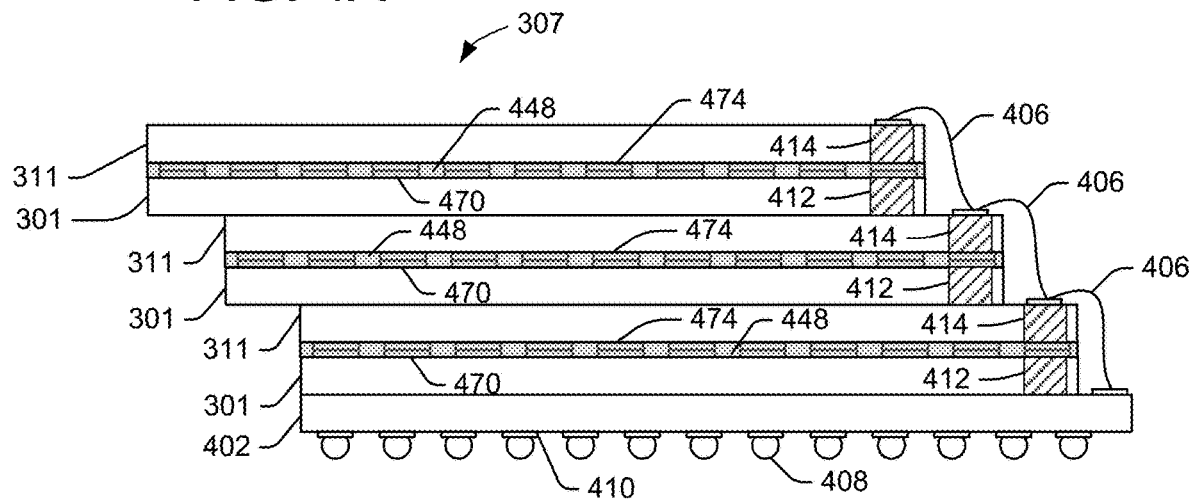
FIG. 4A depicts a side view of an embodiment of an integrated memory assembly stacked on a substrate.

In some embodiments, there is more than one control die 311 and more than one memory structure die 301 in an integrated memory assembly 307. In some embodiments, the integrated memory assembly 307 includes a stack of multiple control die 311 and multiple memory structure die 301. FIG. 4A depicts a side view of an embodiment of an integrated memory assembly 307 stacked on a substrate 402 (e.g., a stack comprising control dies 311 and memory structure dies 301). The integrated memory assembly 307 has three control dies 311 and three memory structure dies 301. In some embodiments, there are more than three memory structure dies 301 and more than three control die 311.

Each control die 311 is affixed (e.g., bonded) to at least one of the memory structure dies 301. Some of the bond pads 470, 474, are depicted. There may be many more bond pads. A space between two dies 301, 311 that are bonded together is filled with a solid layer 448, which may be formed from epoxy or other resin or polymer. This solid layer 448 protects the electrical connections between the dies 301, 311, and further secures the dies together. Various materials may be used as solid layer 448, but in embodiments, it may be Hysol epoxy resin from Henkel Corp., having offices in California, USA.

The integrated memory assembly 307 may for example be stacked with a stepped offset, leaving the bond pads at each level uncovered and accessible from above. Wire bonds 406 connected to the bond pads connect the control die 311 to the substrate 402. A number of such wire bonds may be formed across the width of each control die 311 (i.e., into the page of FIG. 4A).

A memory structure die through silicon via (TSV) 412 may be used to route signals through a memory structure die 301. A control die through silicon via (TSV) 414 may be used to route signals through a control die 311. The TSVs 412, 414 may be formed before, during or after formation of the integrated circuits in the semiconductor dies 301, 311. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 408 may optionally be affixed to contact pads 410 on a lower surface of substrate 402. The solder balls 408 may be used to couple the integrated memory assembly 307 electrically and mechanically to a host device such as a printed circuit board. Solder balls 408 may be omitted where the integrated memory assembly 307 is to be used as an LGA package. The solder balls 408 may form a part of the interface between the integrated memory assembly 307 and the memory controller 102.

Figure 4B:
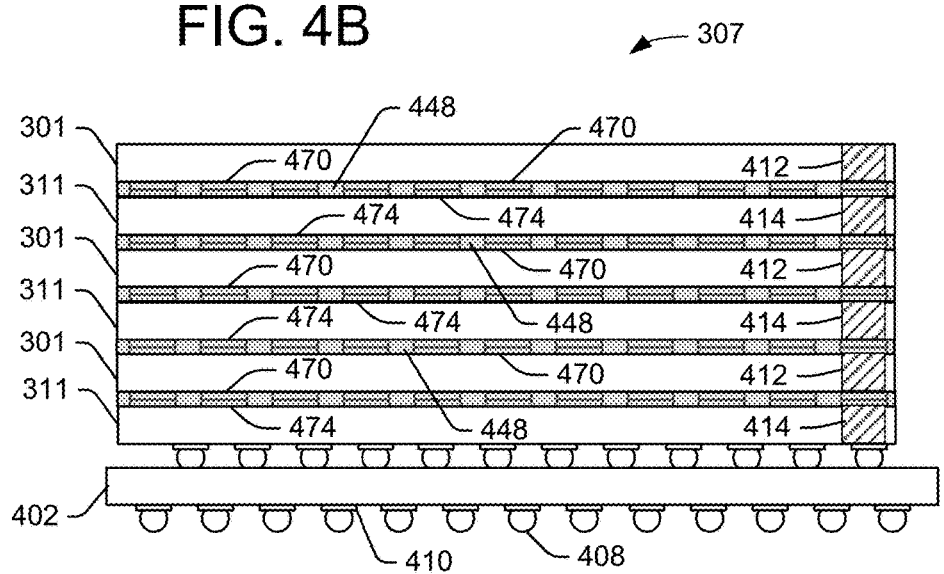
FIG. 4B depicts a side view of an embodiment of an integrated memory assembly stacked on a substrate.

FIG. 4B depicts a side view of an embodiment of an integrated memory assembly 307 stacked on a substrate 402. The integrated memory assembly 307 has three control die 311 and three memory structure die 301. In some embodiments, there are many more than three memory structure dies 301 and many more than three control dies 311. In this example, each control die 311 is bonded to at least one memory structure die 301. Optionally, a control die 311 may be bonded to two memory structure die 301.

Some of the bond pads 470, 474 are depicted. There may be many more bond pads. A space between two dies 301, 311 that are bonded together is filled with a solid layer 448, which may be formed from epoxy or other resin or polymer. In contrast to the example in FIG. 4A, the integrated memory assembly 307 in FIG. 4B does not have a stepped offset. A memory structure die through silicon via (TSV) 412 may be used to route signals through a memory structure die 301. A control die through silicon via (TSV) 414 may be used to route signals through a control die 311.

Solder balls 408 may optionally be affixed to contact pads 410 on a lower surface of substrate 402. The solder balls 408 may be used to couple the integrated memory assembly 307 electrically and mechanically to a host device such as a printed circuit board. Solder balls 408 may be omitted where the integrated memory assembly 307 is to be used as an LGA package.

As has been briefly discussed above, the control die 311 and the memory structure die 301 may be bonded together. Bond pads on each die 301, 311 may be used to bond the two dies together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 µm square and spaced from each other with a pitch of 5 µm to 5 µm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor dies including the bond pads. The film layer is provided around the bond pads. When the dies are brought together, the bond pads may bond to each other, and the film layers on the respective dies may bond to each other. Such a bonding technique may be referred to as hybrid bonding. In embodiments using hybrid bonding, the bond pads may be about 5 µm square and spaced from each other with a pitch of 1 µm to 5 µm. Bonding techniques may be used providing bond pads with even smaller sizes and pitches.

Some embodiments may include a film on surface of the dies 301, 311. Where no such film is initially provided, a space between the dies may be under filled with an epoxy or other resin or polymer. The under-fill material may be applied as a liquid which then hardens into a solid layer. This under-fill step protects the electrical connections between the dies 301, 311, and further secures the dies together. Various materials may be used as under-fill material.

Figure 5:
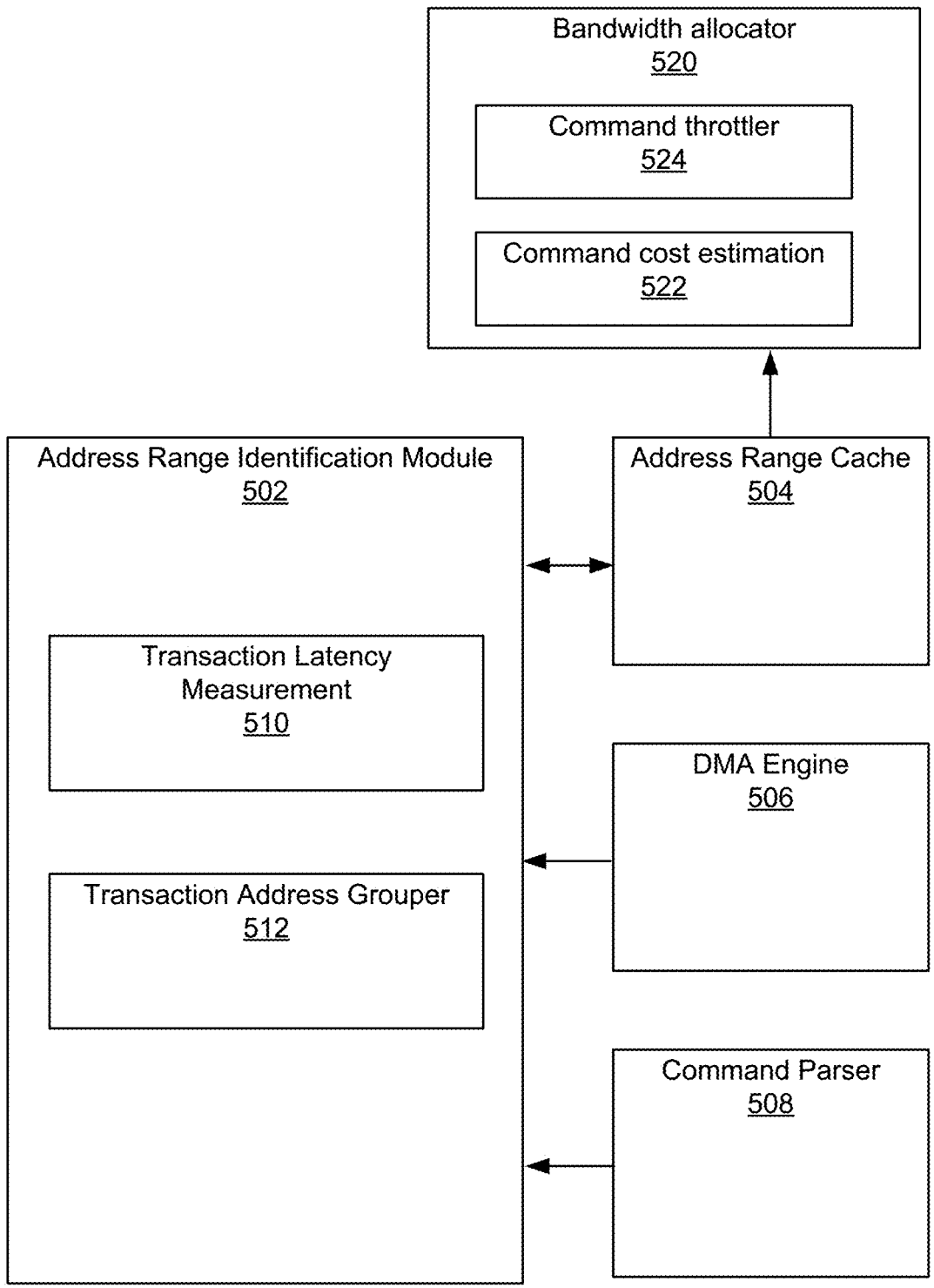
FIG. 5 is a block diagram of modules implemented in a front end of one embodiment of memory controller.

FIG. 5 is a block diagram of element in a front end 110 of one embodiment of memory controller 102. The front end 110 has an address range identification module 502, an address range cache 504, a DMA engine 506, a command parser 508, and a bandwidth allocator 520. The address range identification module 502 has transaction latency measurement 510 and transaction address grouper 512. The transaction latency measurement 510 measures latencies of transactions on a communication bus between the storage system 100 and a host system 120 or target device 140. In an embodiment, the transactions are PCIe transactions over a PCIe bus. The transactions may be for a DMA of host memory 124 or the target device memory 144. For reading the host memory 124 or the target device memory 144, in an embodiment, the latency is the time between when the storage system 100 initiates the PCIe transaction and when the storage system 100 receives the data. For writing to the host memory 124 or the target device memory 144, in an embodiment, the latency is the time between when the storage system 100 initiates the PCIe transaction to write the data and when the storage system 100 receives an acknowledgement for the write.

The transaction address grouper 512, in an embodiment, groups the transaction addresses based on their respective latencies. In one embodiment, the transaction addresses are placed into buckets, with each bucket corresponding to a different range of latencies.

The address range identification module 502 writes to the address range cache 504 to store the transaction latency information. In one embodiment, the address range cache 504 stores a mapping between PCIe addresses (or ranges of PCIe addresses) and PCIe transaction latencies. For example, PCIe addresses can be grouped into different buckets based on their latency. In one embodiment, the PCIe addresses are addresses of data buffers (e.g., 124*a*, 144*a*).

The command parser 508, in one embodiment, parses NVMe commands. An NVMe command may contain a field that identifies the type of command (e.g., read, write, etc.). The NVMe command may contain an LBA field that indicates the starting logical block address (LBA) for a read or write, as well as length field is for the length of the read or write. The NVMe command may also contain a pointer to a data buffer, which is a location in host memory 124 (or target device memory 144) at which data is to be read from (for a write) or stored to (for a read). The NVMe command may also include a physical region page (PRP) list pointer, which points to a list of PRP entries. A PRP entry may be a pointer to a physical memory page in host memory 124 (or target device memory 144). In one embodiment, a PRP entry may be a 64-bit (e.g., 8 Byte) physical memory page address. Each PRP entry points to a different data buffer. Hence, there may be many data buffers for a read or write command. As one example, a PRP list could have 512 PRP entries. For example, the PRP list could be 4 KB in size, with 512 PRP entries that are each 64 bits. In one embodiment, the size of a physical memory page in host memory 124 (or target device memory 144) is configured by the host system 120. For example, the host system 120 might specify that each physical memory page is 4 KB, 8 KB, 16 KB, or some other size.

The DMA engine 506, in one embodiment, controls direct memory access (DMA) with other PCIe devices on the PCIe bus. For example, the DMA engine 506 controls DMA to/from host memory 124 and to/from target device memory 144. In an embodiment, the DMA engine 506 uses the PRP entries (i.e., data buffer pointers) to perform a DMA. In some embodiments, a single DMA may use multiple PRP entries, such as eight PRP entries. Hence, a DMA could access eight data buffers (e.g., eight physical memory pages).

The bandwidth allocator 520 allocates PCIe bus bandwidth to NVMe commands. The bandwidth allocator 520 has a command cost estimation 522 and a command throttler 524. The command cost estimation 522 estimates a cost of performing an NVMe command based on latencies of PCIe transactions that are needed to perform the NVMe command. Thus, this cost is estimated in terms of latencies of transactions on the PCIe bus. The command throttler 524 may throttle NVMe commands based on the aforementioned costs. In one embodiment, the command throttler 524 uses a credit based approach in which credits are allocated to NVMe commands. In one embodiment, if the cost of performing an NVMe command, in terms of transferring data across the PCIe bus, is too high given the current PCIe bus usage then the NVMe command is throttled. That is, the PCIe bus is used for other NVMe commands at that time.

The address cache 504 is non-transitory storage. The address cache 504 may include volatile memory or non-volatile memory. The various modules (address range identification module 502, the DMA engine 506, the command parser 508, and the bandwidth allocator 520) may be implemented in software only, hardware only, or a combination of hardware and software (including firmware). For example, host processor (FIG. 1B, 152) in front end 110 may be programmed by firmware to perform the functions of the modules. A modules can be implemented using a processor, FGA, ASIC, integrated circuit, or other type of circuit.

Figure 6:
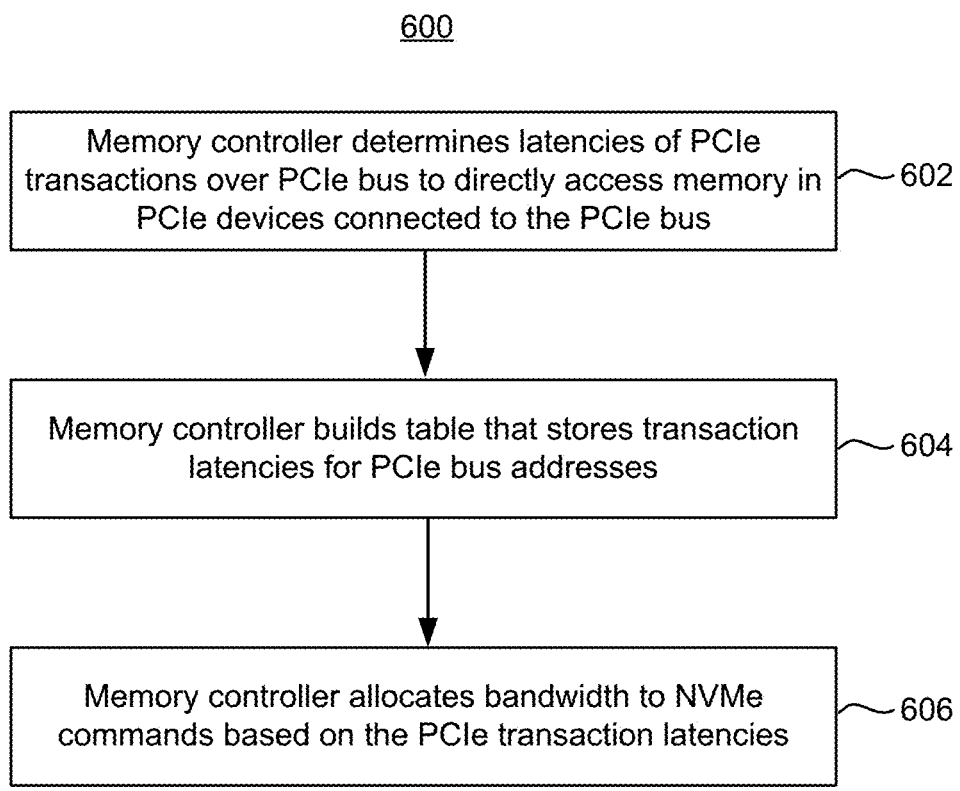
FIG. 6 is a flowchart of one embodiment of a process of allocating PCIe bus bandwidth to NVMe commands based on PCIe transaction latency.

FIG. 6 is a flowchart of one embodiment of a process 600 of allocating PCIe bus bandwidth to NVMe commands based on PCIe transaction latency. Process 600 may be performed by the memory controller 102. More generally, the process 600 can be applied to a first communication protocol, which may be a physical layer protocol (e.g., PCIe), and a second communication protocol (e.g., NVMe), which may be a logical layer protocol above the first communication protocol.

Step 602 includes the memory controller 102 determining latencies of PCIe transactions over the PCIe bus to directly access memory in PCIe devices connected to the PCIe bus. The PCIe transactions are used to access memory of the PCIe transactions in order to implement an NVMe command. The PCIe transactions could include data payload transactions and data control transactions. A data payload transaction involves a DMA to/from memory of another PCIe device of data that was either read from or is to be written to the non-volatile memory 104. A data control transaction involves a DMA to/from memory of another PCIe device of control information needed to complete the execution of an NVMe command, but does not include a DMA of a data payload. Further details of determining latencies of PCIe transactions are shown and described with respect to FIGS. 7, 8A, 9A, 10A, and 11.

Step 604 includes the memory controller 102 building a table that stores PCIe transaction latencies for PCIe bus addresses. The table could store the latency information in a number of ways. In one embodiment, PCIe addresses are placed into "buckets", with each bucket correspond to a different range of latency. In the most basic example, there are two buckets. One bucket contains the PCIe addresses of data buffers having a latency below a threshold, the other bucket contains the PCIe addresses of data buffers having a latency above the threshold. There may be any number of buckets. In one embodiment, the PCIe addresses include the addresses of data buffers (e.g., 124a, 144a). However, the PCIe addresses could correspond to locations of I/O queues (e.g., 124c, 124d, 144b, 144c), or other control data.

Step 606 includes the memory controller 102 allocating PCIe bus bandwidth to NVMe commands based on the PCIe transaction latencies. The purpose of allocating bandwidth to NVMe commands is to allow underlying PCIe transactions to proceed on the PCIe bus in order to transfer data associated with the NVMe commands. Hence, the phrase "allocating PCIe bus bandwidth to an NVMe command" or the like means that one or more underlying PCIe transactions needed to transfer data associated with the NVMe command are allowed to proceed.

In one embodiment, step 606 includes estimating a cost to transfer, across the PCIe bus, data associated with an NVMe command based on the latencies of the underlying PCIe transactions that are needed to transfer the data associated with the NVMe command. The underlying PCIe transactions may include both data payload transactions and data control transactions. However, in one embodiment, only the PCIe transactions for data payload transactions are considered in the cost. The NVMe command is then scheduled for the PCIe bus based on the cost. The phrase "scheduling the NVMe command for the PCIe bus" refers to when PCIe transactions to transfer data for the NVMe command are permitted, relative to other NVMe commands. For example, NVMe commands having a cost greater than a threshold may be throttled, with underlying PCIe transactions for low cost NVMe commands being allowed to execute first.

In one embodiment, step 606 includes allocating PCIe bus bandwidth based on dependencies between data payload transactions and data control transactions. For example, the memory controller might need to perform a control transaction to read PRP lists prior to being able to DMA data to/from a data buffer. Hence, such dependencies may be factored into the scheduling of the NVMe commands for the PCIe bus. Note that if scheduling done purely on the PCIe transactions, without regard for such dependencies, bandwidth allocation would not be as efficient.

Figure 7:
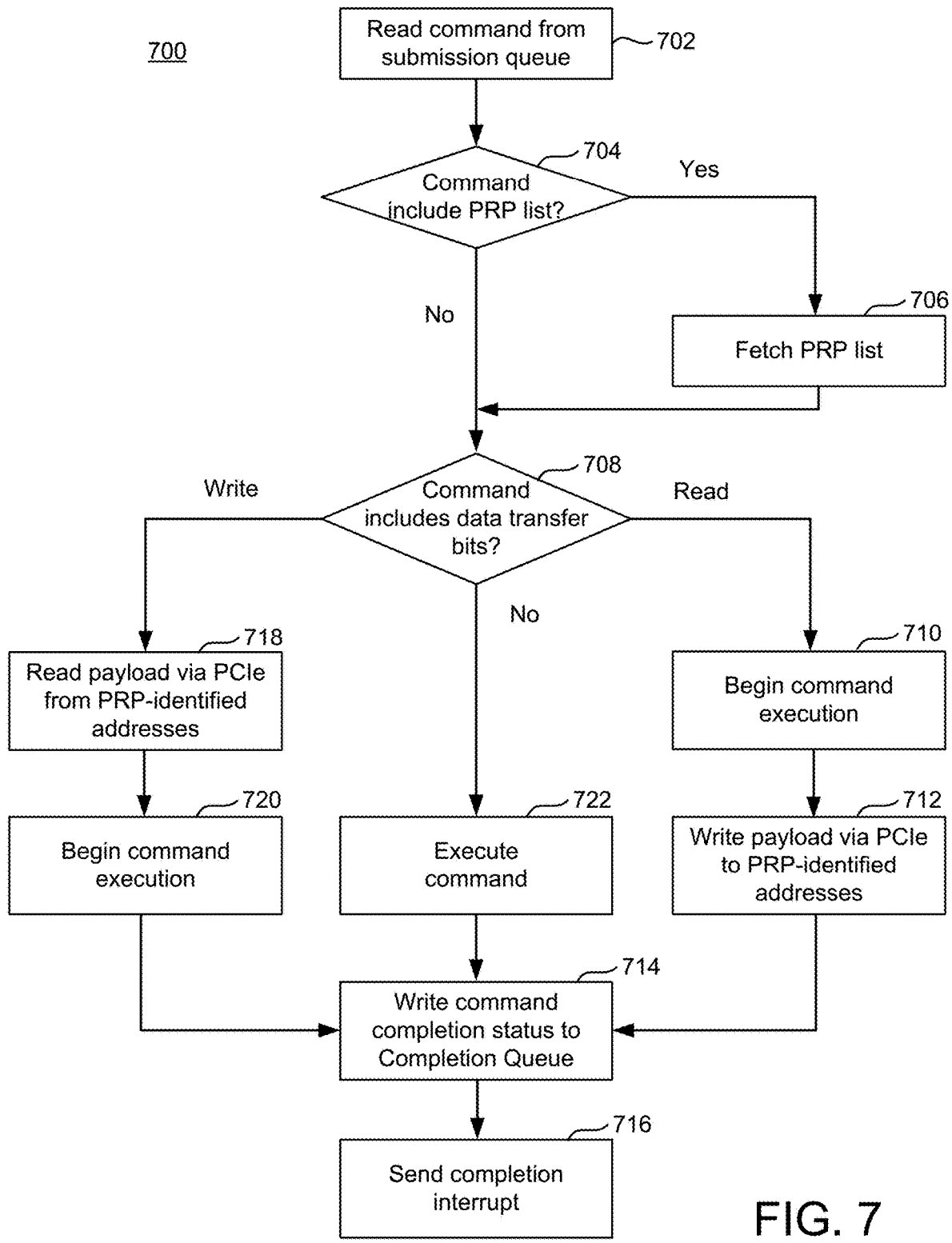
FIG. 7 is a flowchart of an embodiment of a process of NVMe command processing.

As noted above, the memory controller 102 monitors PCIe transaction latencies while processing NVMe commands. FIG. 7 is a flowchart of an embodiment of a process 700 of NVMe command processing. The process 700 will be described to provide an overview of how PCIe transaction latencies may be monitored when executing NVMe commands. In general, the process 700 is divided into data control transactions and data payload transactions. In an embodiment, the memory controller 102 distinguishes between the latencies of data payload transactions and data control transactions. In one embodiment, the latencies of data payload transactions are weighted more heavily in PCIe bus bandwidth allocation than the latencies of data control transactions. The steps in process 700 are described in a certain order to facilitate explanation. However, some steps may occur multiple times for a single NVMe command. The steps could occur in a different order than depicted.

In one embodiment, the process 700 is initiated when either the host system 120 or the target device 140 rings an NVMe doorbell. That is, the host system 120 or the target device 140 may write to a register in the storage system 100 to indicate that an NVMe command has been placed onto an I/O submission queue. Step 702 includes the memory controller 102 reading a command from an I/O submission queue. This could be either an I/O submission queue 124c in host memory 124 or an I/O submission queue 144b in target device memory 144. Hence, step 702 includes a DMA of memory of a host system 120 or target device 140. The DMA involves a PCIe transaction having a PCIe address. In an embodiment, the memory controller 102 measures the latency of this PCIe transaction. Step 702 is an example of a data control transaction.

Step 704 includes a determination of whether the NVMe command includes pointer to a PRP list. If so, then the PRP list is fetched in step 706. The PRP list could be in host memory 124 or in target device memory 144. Hence, step 706 includes a DMA of memory of a PCIe device. The DMA involves a PCIe transaction having a PCIe address. As noted above, a PRP list contains PRP entries, each of which points to a data buffer. The data buffers could be in host memory 124 or in target device memory 144. The data buffers could be in a different PCIe device than the PRP list. For example, the PRP list could be in host memory 124, whereas the data buffers could be in target device memory 144. In an embodiment, the memory controller 102 measures the latency of this PCIe transaction. Step 706 is an example of a data control transaction.

Step 708 includes a determination of whether the NVMe command includes data transfer bits. For, this is a determination of whether this is a read or write command. First the path of the NVMe command being a read command will be discussed. Step 710 includes the memory controller 102 beginning execution of the read command. Note that this refers to the internal execution that includes reading data from non-volatile memory 104. Note that step 710 could being prior to fetching all of the PRP lists in step 706. Step 710 may include determining a physical address in non-volatile memory 104 that corresponds to the logical address in the NVMe command. To make this determination, the memory controller 102 may access the HMB 124e in host memory 124. That is, the memory controller 102 may use the HMB 124e to store a LTP (logical address to physical address) mapping. Hence, step 710 may include a DMA of the host memory 124. The DMA involves a PCIe transaction having a PCIe address. In an embodiment, the memory controller 102 measures the latency of this PCIe transaction. Step 710 is an example of a data control transaction. However, in some cases, the storage system 100 may contain the needed LTP mapping in, for example, DRAM 106. Thus, it is not required that the HMB 124e be accessed in step 710. Step 710 also includes the memory controller 102 reading data from the non-volatile memory 104. The memory controller 102 may perform error correction on the data, and temporarily store the data in volatile memory (e.g., DRAM 106) in the storage system 100.

Step 712 includes writing a payload via PCIe to data buffers identified by PRP entries. The payload contains the data that was read from non-volatile memory 104. The data buffers could be in host memory 124 or in target device memory 144. Hence, step 712 includes one or more DMAs to memory of a PCIe device. Each DMA involves a PCIe transaction having a PCIe address. In an embodiment, the memory controller 102 measures the latency of each PCIe transaction. Step 712 is an example of a data payload transaction.

Step 714 includes the memory controller 102 writing a command completion status to an I/O completion queue. This could be either an I/O completion queue 124d in host memory 124 or an I/O completion queue 144c in target device memory 144. Typically, this will be the same PCIe device that stores the I/O submission queue for this NVMe command. Hence, step 714 includes a DMA to memory of a PCIe device. The DMA involves a PCIe transaction having a PCIe address. In an embodiment, the memory controller 102 measures the latency of this PCIe transaction. Step 714 is an example of a data control transaction.

Step 716 includes the memory controller 102 sending a command interrupt. The command interrupt may be sent to either the host system 120 or the target device 140, depending on the location of the I/O queues for this NVMe command. This ends the processing of the NVMe read command.

Next, processing of an NVMe write command will be discussed. Referring now to step 718, the memory controller 102 reads a payload via PCIe from PRP-identified addressed. Note that step 718 could begin prior to reading all of the PRP lists in step 706. Thus, data buffers identified by PRP entries are read in step 718. The data buffers could be in host memory 124 or in target device memory 144. Hence, step 718 includes one or more DMAs from memory of a PCIe device. Each DMA involves a PCIe transaction having a PCIe address. The data may temporarily be stored in volatile memory in the storage system 100. In an embodiment, the memory controller 102 measures the latency of each PCIe transaction. Step 718 is an example of a data payload transaction.

Step 720 includes the memory controller beginning NVMe command execution. Note that this refers to the internal execution that includes writing data to non-volatile memory 104. Similar to the NVMe read command, the memory controller 102 may use the LTP mapping in the HMB 124e to determine a physical address in non-volatile memory 104 at which to write the data. Hence, step 720 may include a DMA of the host memory 124. The DMA involves a PCIe transaction having a PCIe address. In an embodiment, the memory controller 102 measures the latency of this PCIe transaction. Step 720 is an example of a data control transaction. However, it is not required that the HMB 124e be accessed in step 720. Step 720 also includes the memory controller 102 writing data to the non-volatile memory 104. After step 720, the memory controller performs steps 714 and 716, which are similar to discussed above for the NVMe read command. This concludes processing of the NVMe write command.

Next, processing of an NVMe command other than a read or write will be discussed. Referring now to step 722, the memory controller 102 executes the NVMe command. Typically, the execution of step 722 does not involve a memory access of host memory 124 or target device memory 144. After step 722, the memory controller performs steps 714 and 716. As discussed above, step 714 includes writing a command completion status to an I/O completion queue, which may include a PCIe transaction and a DMA to memory of a PCIe device. In an embodiment, the memory controller 102 measures the latency of this PCIe transaction. As discussed above, step 714 is an example of a data control transaction. Step 716 includes sending a completion interrupt, as discussed above.

Figures 8A, 8B:
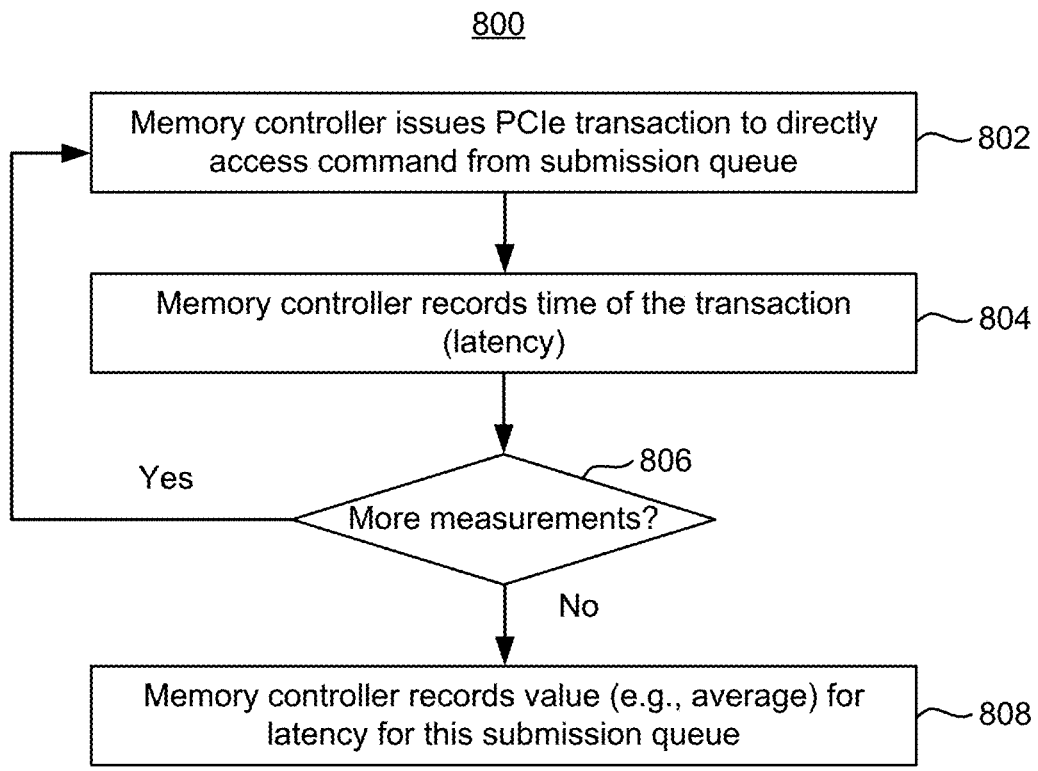
FIG. 8A is a flowchart of one embodiment of a process of monitoring latencies of accessing I/O submission queues.
FIG. 8B depicts an embodiment of a table that maps I/O submission queues to latency.

FIG. 8A is a flowchart of one embodiment of a process 800 of monitoring latencies of accessing I/O submission queues. Process 800 is performed in one embodiment of step 702 of process 700. Process 800 is one embodiment of monitoring latencies of data control transactions. Process 800 may be performed separately for each I/O submission queue in the host system 120, as well as for each I/O submission queue in the target device 140.

Step 802 includes the memory controller 102 issuing a PCIe transaction to directly access (e.g., DMA) an NVMe command from an NVMe I/O submission queue. In an embodiment, the memory controller 102 sends a packet to the PCIe switch 130, which forwards the packet to the PCIe root complex 126. The packet may contain a PCIe address. The PCIe root complex 126 may perform address translation. If the PCIe address is in the BAR of target device 140, then the PCIe root complex 126 may forward the packet to the PCIe interface 146 in the target device 140. A result of step 802 is a DMA from memory of a PCIe device (e.g., host system 120 or target device 140) to storage system 100.

Step 804 includes the memory controller 102 recording the latency of the PCIe transaction. The latency in this case is the time between when the memory controller 102 issued the PCIe transaction until when the memory controller 102 received the data (i.e., the NVMe command).

The memory controller 102 may continue to monitor PCIe transactions for this I/O submission queue until the memory controller determines that an adequate number of measurements have been made to achieve a target accuracy (in step 806). The memory controller 102 may perform a fixed number of measurements, which could be as few as a single measurement. Hence, steps 802 and 804 may be repeated for other NVMe commands on this I/O submission queue. In step 808, the memory controller 102 records a value for the latency for this I/O submission queue. The value could be, for example, an average (e.g., mean, median) latency. Outliers (e.g., unusually long, unusually short) values could be ignored if the mean value is used. In an embodiment, the value is recorded in the address range cache 504. After step 808, the process could return to step 802 to continue to monitor the latency in order to update the value in step 808.

FIG. 8B depicts an embodiment of a table 850 that maps I/O submission queues to latency. The table 850 has a column labeled address, which contains an entry for each I/O submission queue. Each submission queue could be identified by a PCI address for that submission could, or in another manner. For example, the way in which NVMe identifies each I/O submission queue could be used. For example, NVMe may have a unique identifier for each I/O submission queue, which could be used instead of the PCIe address. The latency column has an entry for each I/O submission queue to specify the latency for that I/O submission queue. As noted above, the latency for each queue may be determined based on "n" measurements. The latency could be updated from time to time, but that is not required. The cost column has a cost of the PCIe transaction, which is based on the latency. Hence, a longer latency will correspond to a higher cost. In an embodiment, the cost is used when allocating bandwidth.

Figures 9A, 9B:
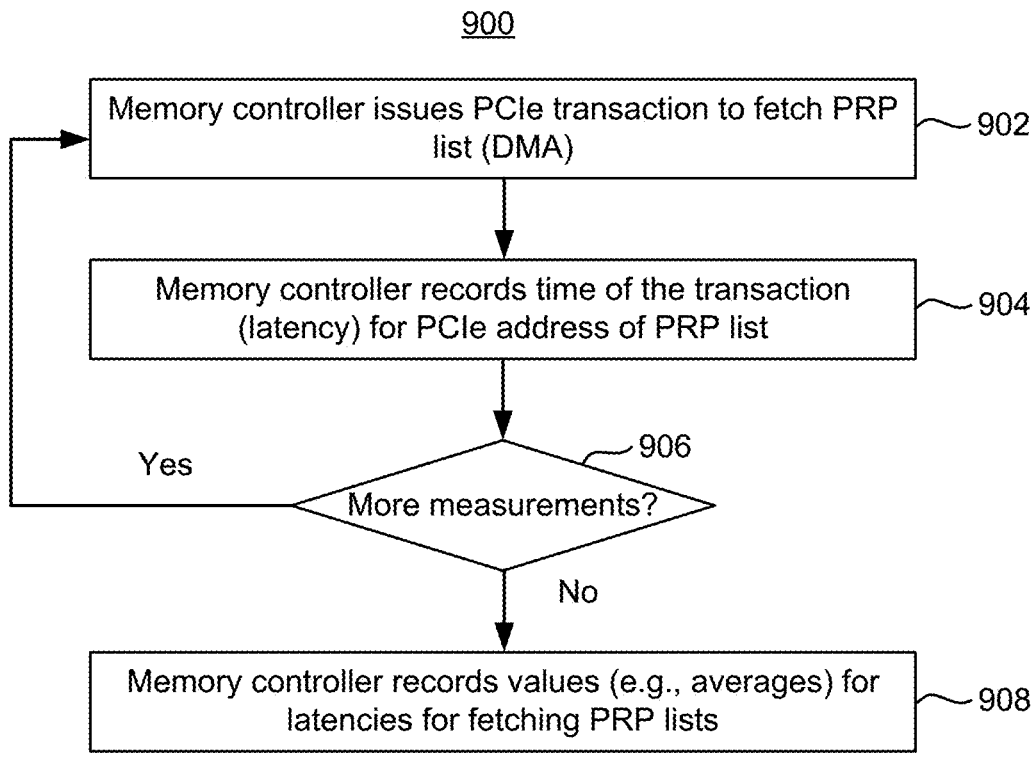
FIG. 9A is a flowchart of one embodiment of a process of monitoring latencies of fetching PRP lists.
FIG. 9B depicts an embodiment of a table that maps PRP List addresses to latency.

FIG. 9A is a flowchart of one embodiment of a process 900 of monitoring latencies of fetching PRP lists. Process 900 is performed in one embodiment of step 706 of process 700. Process 900 is one embodiment of monitoring latencies of data control transactions.

Step 902 includes the memory controller 102 issuing a PCIe transaction to directly access (e.g., DMA) a PPR list. The PRP list is located in either host memory 124 or target device memory 144. In an embodiment, the memory controller 102 sends a packet to the PCIe switch 130, which forwards the packet to the PCIe root complex 126. The packet may contain a PCIe address that corresponds to the location in memory (e.g., host memory 124 or target device memory 144) at which the PRP list resides. The PCIe root complex 126 may perform address translation. If the PCIe address is in the BAR of target device 140, then the PCIe root complex 126 may forward the packet to the PCIe interface 146 in the target device 140. A result of step 902 is a DMA from memory of a PCIe device (e.g., host system 120 or target device 140) to storage system 100.

Step 904 includes the memory controller 102 recording the latency of this PCIe transaction for this PRP list. The latency in this case is the time between when the memory controller 102 issued the PCIe transaction until when the memory controller 102 received the data (i.e., the PRP list).

The memory controller 102 may continue to monitor PCIe transactions for PRP lists until the memory controller determines that an adequate number of measurements have been made to achieve a target accuracy (in step 906). The memory controller 102 may perform a fixed number of measurements, which could be as few as a single measurement. Hence, steps 902 and 904 may be repeated for other PRP lists. In step 908, the memory controller 102 records values for latencies for the PRP lists. As noted, there may be a PCIe address that corresponds to each PRP list. A value could be recorded for each PCIe address. Another option is to bucket the PCIe addresses based on latency. The simplest example is to place the PCIe addresses into two buckets. A fast bucket is for PCIe addresses having latency below a threshold, and slow bucket us for PCIe addresses having a latency above the threshold. More than two buckets could be used. Note that the latency for each PCIe address could be based on a single measurement, or based on multiple measurements for that PCIe address. In an embodiment, the values are recorded in the address range cache 504. After step 908, the process could return to step 902 to continue to monitor the latency in order to update the values in step 908.

FIG. 9B depicts an embodiment of a table 950 that maps PRP List addresses to latency. The table 950 has a column labeled address, which contains several entries. Each entry contains a set of addresses having similar latency. For example, the PRP list addresses having the lowest latency or grouped (or "bucketed") into a low latency group. The PRP list addresses having the highest latency or grouped (or "bucketed") into a high latency group. There may be more than two groups, to allow for a finer granularity in latency. The cost column has a cost of the PCIe transaction to fetch a PRP list, which is based on the latency. Hence, a longer latency will correspond to a higher cost. In an embodiment, the cost is used when allocating PCIe bus bandwidth.

FIG. 10A is a flowchart of one embodiment of a process 1000 of monitoring latencies of DMAs of data for an NVMe write command. The data may be accessed by memory controller 102 from, for example, host memory 124 or target device memory 144. Process 1000 is performed in one embodiment of step 718 of process 700. Process 1000 is one embodiment of monitoring latencies of data payload transactions.

Step 1002 includes the memory controller 102 issuing a PCIe transaction to directly read (e.g., DMA) data from a data buffer of a PCIe device (e.g., host system 120, target device 140). In an embodiment, the memory controller 102 sends a packet to the PCIe switch 130, which forwards the packet to the PCIe root complex 126. The packet may contain a PCIe address that corresponds to the location in memory (e.g., host memory 124 or target device memory 144) at which the data buffer resides. The PCIe root complex 126 may perform address translation. If the PCIe address is in the BAR of target device 140, then the PCIe root complex 126 may forward the packet to the PCIe interface 146 in the target device 140. A result of step 1002 is a DMA from memory of a PCIe device (e.g., host system 120 or target device 140) to storage system 100.

Step 1004 includes the memory controller 102 recording the latency of this PCIe transaction for this data buffer. The latency in this case is the time between when the memory controller 102 issued the PCIe transaction until when the memory controller 102 received the data (i.e., the data to be written to non-volatile memory 104).

The memory controller 102 may continue to monitor PCIe transactions for reads of data buffers until the memory controller determines that an adequate number of measurements have been made to achieve a target accuracy (in step 1006). The memory controller 102 may perform a fixed number of measurements, which could be as few as a single measurement. Hence, steps 1002 and 1004 may be repeated for other data buffers. In step 1008, the memory controller 102 records a mapping of PCIe addresses to latencies. As noted, there may be a PCIe address that corresponds to each data buffer. A value could be recorded for each PCIe address. Another option is to bucket the PCIe addresses based on latency, similar to what was described for PRP lists in step 908 of process 900. Hence, the PCIe addresses could be mapped to two or more groups, based on latency. Note that the latency for each PCIe address could be based on a single measurement, or based on multiple measurements for that PCIe address. In an embodiment, the values are recorded in the address range cache 504. After step 1008, the process could return to step 1002 to continue to monitor the latency in order to update the values in step 1008.

FIG. 10B depicts an embodiment of a table 1050 that maps PCIe addresses to latency. The table 1050 may be created or updated in in step 1008. The table 1050 has a number of entries, which each contain PCIe addresses that are bucketed into different latencies. The PCIe addresses correspond to the addresses of data buffers (e.g., data buffers 124a, 144a). Each entry contains a set of addresses having similar latency. For example, the PCIe addresses having a latency of L1 or faster are grouped (or "bucketed") into a low latency group. Other groups are for PCIe addresses having a latency between L1 and L2, between L2 and L3, and higher than L3. In general, there are two or more latency groups. The cost column has a cost of the PCIe transactions in each respective bucket, which is based on the latency. Hence, a longer latency will correspond to a higher cost. In an embodiment, the cost is used when allocating PCIe bus bandwidth.

FIG. 10C depicts an alternative embodiment of a table 1070 that stores PCIe transaction latency information. The table 1070 may be created or updated in in step 1008. The table 1070 is based on I/O submission queues. In this embodiment, it is assumed that the data buffers used in connection with a given I/O submission queue will likely be in the same PCIe device. For example, the data buffers will likely be in one of the host system 120 or target device 140, but not both. Hence, latencies for the data buffers associated with a given I/O submission queue are likely to be similar. Hence, each entry in the "I/O Submission Queue Data Buffer Grouping" column pertains to the latency to access the data buffers for one of the I/O submission queues. The cost column has a cost of the PCIe transactions to access the data buffers associated with each respective I/O submission queue. In an embodiment, the cost is used when allocating PCIe bus bandwidth.

Figure 11:
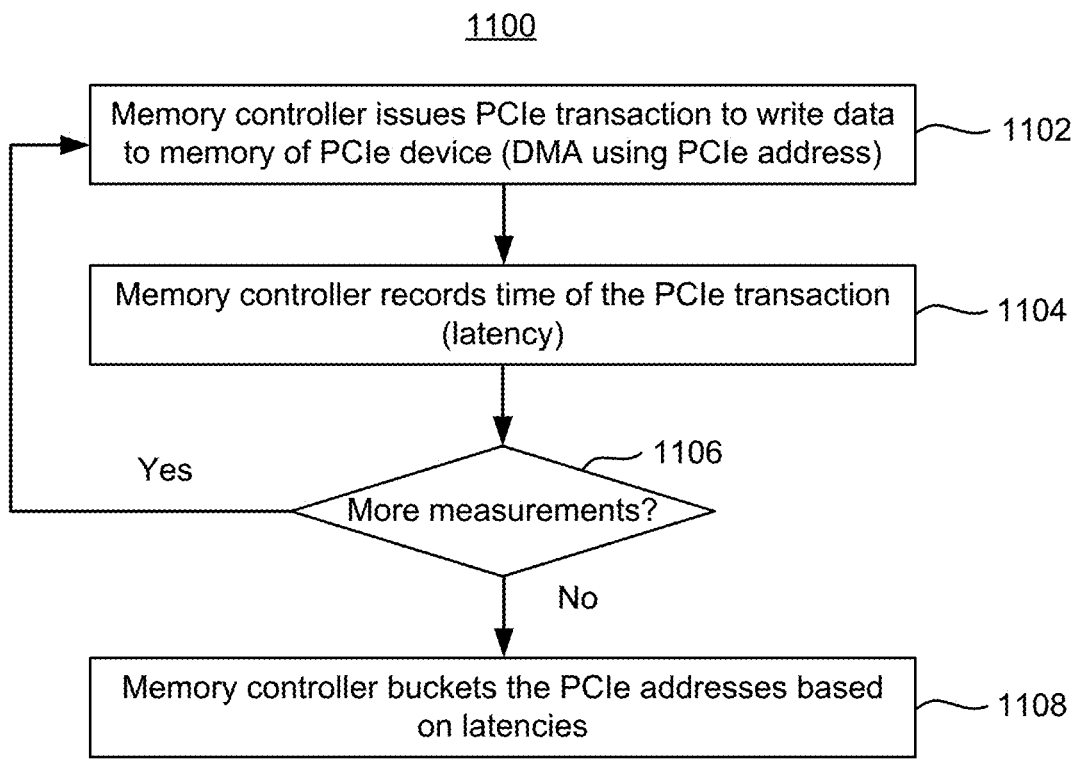
FIG. 11 is a flowchart of one embodiment of a process of monitoring latencies of DMAs of data for an NVMe read command.

FIG. 11 is a flowchart of one embodiment of a process 1100 of monitoring latencies of DMAs of data for an NVMe read command. The data may be written by memory controller 102 to, for example, host memory 124 or target device memory 144. Process 1100 is performed in one embodiment of step 712 of process 700. Process 1100 is one embodiment of monitoring latencies of data payload transactions.

Step 1102 includes the memory controller 102 issuing a PCIe transaction to directly write (e.g., DMA) data to a data buffer of a PCIe device (e.g., host system 120, target device 140). In an embodiment, the memory controller 102 sends a packet to the PCIe switch 130, which forwards the packet to the PCIe root complex 126. The packet may contain a PCIe address that corresponds to the location in memory (e.g., host memory 124 or target device memory 144) at which the data buffer resides. The PCIe root complex 126 may perform address translation. If the PCIe address is in the BAR of target device 140, then the PCIe root complex 126 may forward the packet to the PCIe interface 146 in the target device 140. A result of step 1102 is a DMA from storage system 100 to memory of a PCIe device (e.g., host system 120 or target device 140).

Step 1104 includes the memory controller 102 recording the latency of this PCIe transaction for this data buffer. In an embodiment, the latency is the time between when the memory controller 102 issued the PCIe transaction until when the memory controller 102 receives an acknowledgment that the data was written to memory of the other PCIe device.

The memory controller 102 may continue to monitor PCIe transactions for writes to data buffers until the memory controller determines that an adequate number of measurements have been made to achieve a target accuracy (in step 1106). The memory controller 102 may perform a fixed number of measurements, which could be as few as a single measurement per PCIe address. Hence, steps 1102 and 1104 may be repeated for other data buffers. In step 1108, the memory controller 102 records a mapping of PCIe addresses to latencies. As noted, there may be a PCIe address that corresponds to each data buffer. A value could be recorded for each PCIe address. Another option is to bucket the PCIe addresses based on latency, similar to what was described for PRP lists in step 908 of process 900. Hence, the PCIe addresses could be mapped to two or more groups, based on latency. Hence, a table such as table 1050 in FIG. 10B could be formed based on NVMe reads. Another option is to build a table similar to table 1070 in FIG. 10C. In one embodiment, the memory controller 102 does not differentiate between NVMe reads and writes when forming the tables 1050, 1070. That is, the tables 1050, 1070 may be formed based on PCIe addresses for date buffer DMAs regardless of whether it is a read or write NVMe command. In another embodiment, a separate table is created for NVMe read and NVMe write DMAs. Note that the latency for each PCIe address could be based on a single measurement, or based on multiple measurements for that PCIe address. In an embodiment, the values are recorded in the address range cache 504. After step 1108, the process could return to step 1102 to continue to monitor the latency in order to update the values in step 1108.

Figure 12:
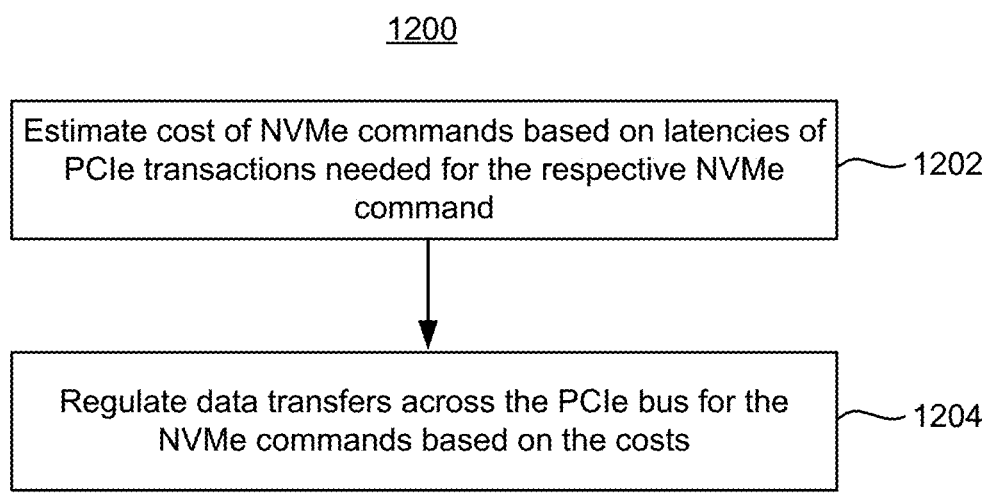
FIG. 12 is a flowchart of one embodiment of a process of allocating PCIe bus bandwidth to NVMe commands based on PCIe transaction latency.

FIG. 12 is a flowchart of one embodiment of a process 1200 of allocating PCIe bus bandwidth to NVMe commands based on PCIe transaction latency. Process 1200 is used in one embodiment of step 606 of process 600.

Step 1202 includes estimating costs for respective NVMe commands based on latencies of PCIe transactions needed for the NVMe commands. The cost refers to the cost of underlying PCIe transactions that transfer data across the PCIe bus, with the data being associated with the NVMe command. The data could be payload data and/or control data. One option is to factor in both the control data transactions and the data payload transactions. Another option is to only use the cost for the data payload transactions. Referring back to FIG. 7, in one embodiment, the data payload transactions are for the DMAs to/from the data buffers (e.g., data buffers 124a, 144a) in step 712 or 718. There may be many PCIe transactions for a given NVMe read or write transaction. For example, each PCIe transaction may access a data buffer that is, for example, 4 KB, 8 KB, 16 KB, or some other size. However, the NVMe command may read or write a much larger size of data. However, optionally, the cost of one of more of the control transactions may be factored into the calculation in step 1202.

The following examples will be used to illustrate possible ways in which the cost may be estimated. In step 702 of process 700 an NVMe command is accessed from an I/O submission queue. In one embodiment, a cost for that NVMe command is estimated at that time. As one example, the NVMe command may specify a total amount of data to be transferred across the PCIe bus for a read or write. That is, this is the total amount to be transferred to or from a data buffer (e.g., 124a, 144a). In an embodiment, the memory controller 102 tracks latencies to access data buffers that are associated with this particular I/O submission queue. Table 1070 in FIG. 10C illustrates an example of tracking latency to access data buffers based on I/O submission queue. Hence, the memory controller 102 may make an estimate of the cost to access the data buffers for this NVMe command at this time.

As another example of estimating the cost, the memory controller 102 may wait until step 706 of process 700, when the PRP lists are fetched. The PRP lists have pointers to the data buffers. In an embodiment, the memory controller 102 tracks latencies to access the respective data buffers (based on PCIe address). Table 1050 in FIG. 10B illustrates an example of tracking latency based on PCIe address, in which the PCIe addresses are bucketing into groups based on latency. Hence, the memory controller 102 may estimate the cost based on the latencies for the respective PCIe addresses. Note that the memory controller 102 may estimate the cost prior to having all of the PRP lists for this NVMe command. One option is to assume that the data buffers pointed to by the other PRP lists will have similar latency as those for the PRP list(s) that was obtained. Such an assumption may be made because it is likely that the data buffers for a given NVMe command have a similar latency, such as being in the same PCIe device. For example, either the data buffers will all be in host memory 124 or all in target memory 144. However, the memory controller 102 will typically not be able to determine whether the data buffers are in the host system memory 124 or the target device memory 144 based just on the PCIe addresses. This is because the NVMe protocol does not segregate PCIe addresses or mark them in any special way. Hence, the PCIe addresses may look the same to the memory controller 102 as direct physical addresses in host memory 124 or target device memory 144.

Step 1204 includes regulating data transfers across the PCIe bus for the NVMe commands based on the estimated costs. Note that if the PCIe bus is presently not saturated with PCIe transactions, then it may be possible to allow all of the NVMe commands to proceed, without any throttling. However, if the PCIe bus is saturated, then throttling some of the NVMe commands can improve efficiency. That is, holding off some of the NVMe commands until the PCIe bus is no longer saturated can improve efficiency by, for example, avoiding bottlenecks and/or avoiding collisions in the buffers of the PCIe root complex 126.

In an embodiment, a credit based approach is used in step 1204. In a credit based approach, NVMe commands whose cost is lower than a threshold may be allocated bandwidth on the PCI bus, whereas NVMe commands having a cost greater than the threshold may be throttled. The throttled NVMe commands are held off from using PCIe bus bandwidth for the time being. The throttled NVMe commands may be allowed to execute (i.e., allocated bandwidth on the PCIe bus) when the PCIe bus is not so busy. In the event that the PCIe bus stays busy, the throttled NVMe commands may be allowed to execute after a certain amount of time has passed.

In view of the foregoing, it can be seen that a first embodiment includes an apparatus, comprising a first communication interface configured to issue transactions over a communication bus in accordance with a first communication protocol, a second communication interface configured to control access to non-volatile memory in accordance with a second communication protocol, and a control circuit coupled to the first communication interface and to the second communication interface. The control circuit is configured to instruct the first communication interface to issue transactions of the first communication protocol over the communication bus to directly access memory of electronic devices connected to the communication bus. The transactions are associated with storage commands to access the non-volatile memory in accordance with the second communication protocol. The control circuit is configured to determine latencies of the transactions, each transaction having a communication bus address. The control circuit is configured to allocate bandwidth on the communication bus to storage commands of the second communication protocol based on the latencies of the transactions of the first communication protocol.

In a second embodiment, in furtherance to the first embodiment, the first communication protocol is a physical layer protocol, and the second communication protocol is a logical layer protocol above the first communication protocol.

In a third embodiment, in furtherance to the first or second embodiments, the first communication protocol is Peripheral Computer Interface Express (PCIe), and the second communication protocol is Non-Volatile Memory Express (NVMe).

In a fourth embodiment, in furtherance to any of the first to third embodiments, the control circuit configured to estimate costs of transferring data associated with the storage commands across the communication bus based on the latencies of the transactions. The control circuit configured to regulate data transfers across the communication bus for the storage commands based on the estimated costs in order to allocate communication bus bandwidth to the storage commands.

In a fifth embodiment, in furtherance to any of the first to fourth embodiments, the control circuit is further configured to determine latencies of data control transactions, determine latencies of data payload transactions, and allocate bandwidth on the communication bus to storage commands of the second communication protocol based on dependencies between the data payload transactions and the data control transactions for the storage commands.

In a sixth embodiment, in furtherance to any of the first to fifth embodiments, the control circuit is further configured to measure latencies for transactions of the first communication protocol over the communication bus that store data to read data buffers. Each read data buffer residing in memory of one of the electronic devices connected to the communication bus. The control circuit is further configured to allocate bandwidth on the communication bus to the storage commands of the second communication protocol based on the latencies of the transactions of the first communication protocol that access the read data buffers, wherein the storage commands comprise read commands.

In a seventh embodiment, in furtherance to any of the first to sixth embodiments, the control circuit is further configured to measure latencies for transactions of the first communication protocol over the communication bus that read data from write data buffers. Each write data buffer residing in memory of one of the electronic devices connected to the communication bus, wherein the storage commands comprises write commands. The control circuit is configured to allocate bandwidth on the communication bus to the storage commands of the second communication protocol based on the latencies of the transactions of the first communication protocol that access the write data buffers.

In an eighth embodiment, in furtherance to any of the first to seventh embodiments, the control circuit configured to determine a total latency for transactions of the first communication protocol needed for a storage command of the second communication protocol and schedule the storage command for access to the communication bus based on the total latency.

In a ninth embodiment, in furtherance to any of the first to eighth embodiments, the control circuit is configured to measure latencies of transactions of the first communication protocol over the communication bus that access command submission queues of the second communication protocol. Each command submission queue residing in memory of one of the electronic devices connected to the communication bus. The control circuit is configured to allocate the bandwidth on the communication bus to the storage commands of the second communication protocol based on the latencies of the transactions of the first communication protocol that access command submission queues of the second communication protocol.

In a tenth embodiment, in furtherance to any of the first to ninth embodiments, the control circuit is further configured to measure latencies of transactions of the first communication protocol over the communication bus that access lists of pointers to data buffers. Each list of pointers resides in memory of one of the electronic devices connected to the communication bus. The lists of pointers to data buffers being compliant with the second communication protocol. The control circuit is further configured to allocate bandwidth on the communication bus to the storage commands of the second communication protocol based on the latencies of the transactions of the first communication protocol that access the lists of pointers to data buffers.

In an eleventh embodiment, in furtherance to any of the first to tenth embodiments, the electronic devices connected to the communication bus comprise a central processing unit (CPU) and a graphics processing unit (GPU).

One embodiment includes a method of operating a non-volatile storage system. The method comprises determining, by a memory controller of the non-volatile storage system, latencies of Peripheral Computer Interconnected Express (PCIe) transactions over a PCIe bus to directly access memory in respective PCIe devices connected to the PCIe bus. Each PCIe transaction has a PCIe address. The method comprises grouping, by the memory controller, the PCIe addresses based on the latencies of the PCIe transactions. The method comprises scheduling, by the memory controller, Non-Volatile Memory Express (NVMe) commands to access the PCIe bus based on the latencies of the PCIe transactions. The method comprises initiating, by the memory controller, PCIe transactions on the PCI bus to execute the NVMe commands in accordance with the schedule, including initiating multiple PCIe transactions for each NVMe command.

One embodiment includes a non-volatile memory system, comprising non-volatile memory, a Peripheral Computer Interface Express (PCIe) interface configured to control PCIe transactions over a PCIe bus, and a Non-Volatile Memory Express (NVMe) interface configured to process NVMe commands received on the PCIe bus to access the non-volatile memory. The PCIe interface is configured to issue PCIe transactions to directly access data buffers in a plurality of processors connected to the PCIe bus. The non-volatile memory system comprises means for determining latencies of the PCIe transactions that directly access the data buffers in the plurality of processors. The PCIe transactions that directly access the data buffers comprise data payload transactions. The non-volatile memory system comprises means for regulating data transfers across the PCIe bus for the NVMe commands based on the latencies of the PCIe transactions that directly access the data buffers in the plurality of processors.

In an embodiment, the means for determining latencies of the PCIe transactions that directly access the data buffers in the plurality of processors comprises one or more of host processor 152, address range identification module 502, transaction latency measure 510, transaction address grouping, an FGA, an ASIC, an integrated circuit, or other type of circuit. In an embodiment, the means for determining latencies of the PCIe transactions that directly access the data buffers in the plurality of processors performs one of more of processes 1000 and/or 1100.

In an embodiment, the means for regulating data transfers across the PCIe bus for the NVMe commands based on the latencies of the PCIe transactions that directly access the data buffers in the plurality of processors comprises one or more of host processor 152, bandwidth allocator 520, an FGA, an ASIC, an integrated circuit, or other type of circuit. In an embodiment, the means for regulating data transfers across the PCIe bus for the NVMe commands based on the latencies of the PCIe transactions that directly access the data buffers in the plurality of processors performs process 1200.

In an embodiment, means for determining latencies of PCIe control transactions that directly access NVMe Input/Output (I/O) queues or physical region page (PRP) lists in memory of the plurality of processors connected to the PCIe bus comprises one or more of host processor 152, address range identification module 502, transaction latency measure 510, transaction address grouping, an FGA, an ASIC, an integrated circuit, or other type of circuit. In an embodiment, the means for determining latencies of PCIe control transactions that directly access NVMe Input/Output (I/O) queues or physical region page (PRP) lists in memory of the plurality of processors connected to the PCIe bus performs one of more of processes 800 and/or 900.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
   a first communication interface configured to issue transactions over a communication bus in accordance with a first communication protocol to electronic devices connected to the communication bus, wherein the first communication protocol is a physical layer protocol;
   a second communication interface configured to process storage commands of a second communication protocol received over the communication bus to control access to non-volatile memory in accordance with the second communication protocol, wherein the second communication protocol is a logical layer protocol above the first communication protocol; and
   a control circuit coupled to the first communication interface and to the second communication interface, the control circuit configured to:
     instruct the first communication interface to issue the transactions of the first communication protocol over the communication bus to perform a direct memory access (DMA) of the electronic devices connected to the communication bus;
     determine latencies of the issued transactions, each transaction having a communication bus address; and
     allocate bandwidth on the communication bus to the storage commands of the second communication protocol based on the latencies of the issued transactions of the first communication protocol.

2. The apparatus of claim 1, wherein:
   the first communication protocol is Peripheral Computer Interface Express (PCIe); and
   the second communication protocol is Non-Volatile Memory Express (NVMe).

3. The apparatus of claim 1, wherein the control circuit configured to:
   estimate costs of transferring data associated with the storage commands across the communication bus based on the latencies of the transactions; and
   regulate data transfers across the communication bus for the storage commands based on the estimated costs in order to allocate communication bus bandwidth to the storage commands.

4. The apparatus of claim 1, wherein the control circuit is further configured to:

determine latencies of data control transactions;
determine latencies of data payload transactions; and
allocate bandwidth on the communication bus to storage commands of the second communication protocol based on dependencies between the data payload transactions and the data control transactions for the storage commands.

5. The apparatus of claim 1, wherein the control circuit is further configured to:
measure latencies for transactions of the first communication protocol over the communication bus that store data to read data buffers, each read data buffer residing in memory of one of the electronic devices connected to the communication bus; and
allocate bandwidth on the communication bus to the storage commands of the second communication protocol based on the latencies of the transactions of the first communication protocol that access the read data buffers, wherein the storage commands comprise read commands.

6. The apparatus of claim 1, wherein the control circuit is further configured to:
measure latencies for transactions of the first communication protocol over the communication bus that read data from write data buffers, each write data buffer residing in memory of one of the electronic devices connected to the communication bus, wherein the storage commands comprises write commands; and
allocate bandwidth on the communication bus to the storage commands of the second communication protocol based on the latencies of the transactions of the first communication protocol that access the write data buffers.

7. The apparatus of claim 1, wherein the control circuit configured to:
determine a total latency for transactions of the first communication protocol needed for a storage command of the second communication protocol; and
schedule the storage command for access to the communication bus based on the total latency.

8. The apparatus of claim 1, wherein the control circuit configured to:
measure latencies of transactions of the first communication protocol over the communication bus that access command submission queues of the second communication protocol, each command submission queue residing in memory of one of the electronic devices connected to the communication bus; and
allocate the bandwidth on the communication bus to the storage commands of the second communication protocol based on the latencies of the transactions of the first communication protocol that access command submission queues of the second communication protocol.

9. The apparatus of claim 1, wherein the control circuit is further configured to:
measure latencies of transactions of the first communication protocol over the communication bus that access lists of pointers to data buffers, each list of pointers residing in memory of one of the electronic devices connected to the communication bus, the lists of pointers to data buffers being compliant with the second communication protocol; and
allocate bandwidth on the communication bus to the storage commands of the second communication protocol based on the latencies of the transactions of the first communication protocol that access the lists of pointers to data buffers.

10. The apparatus of claim 1, wherein the electronic devices connected to the communication bus comprise:
a central processing unit (CPU); and
a graphics processing unit (GPU).

11. A method of operating a non-volatile storage system, the method comprising:
determining, by a memory controller of the non-volatile storage system, latencies of Peripheral Computer Interconnected Express (PCIe) transactions over a PCIe bus to directly access memory in respective PCIe devices connected to the PCIe bus, each PCIe transaction having a PCIe address;
grouping, by the memory controller, the PCIe addresses based on the latencies of the PCIe transactions;
scheduling, by the memory controller, Non-Volatile Memory Express (NVMe) commands to access the PCIe bus based on the latencies of the PCIe transactions; and
initiating, by the memory controller, PCIe transactions on the PCI bus to execute the NVMe commands in accordance with the schedule, including initiating multiple PCIe transactions for each NVMe command.

12. The method of claim 11, wherein:
determining latencies of PCIe transactions over the PCIe bus to directly access memory in respective PCIe devices connected to the PCIe bus comprises measuring latencies of PCIe transactions that directly access NVMe submission queues, each NVMe submission queue residing in memory of one of the PCIe devices; and
grouping the PCIe addresses based on the latencies of the PCIe transactions comprises grouping the NVMe submission queues based on the PCIe transaction latencies to directly access the NVMe submission queues.

13. The method of claim 11, wherein:
determining latencies of PCIe transactions over the PCIe bus to directly access memory in respective PCIe devices connected to the PCIe bus comprises measuring latencies of PCIe transactions that directly access NVMe submission queues, each command submission queue residing in memory of one of the PCIe devices measuring latencies of PCIe transactions that directly access NVMe data buffers, each data buffer residing in memory of one of the PCIe devices; and
grouping the PCIe addresses based on the latencies of the PCIe transactions comprises placing the PCIe addresses into different groups based on the latencies of the PCIe transactions that directly access the NVMe data buffers.

14. The method of claim 11, wherein scheduling the NVMe commands to access the PCIe bus based on the latencies of the PCIe transactions comprises:
estimating a cost to implement an NVMe command based on the latencies of PCIe transactions to implement the NVMe command; and
determining whether the estimated cost exceeds a threshold.

15. A non-volatile memory system, comprising:
non-volatile memory;
a Peripheral Computer Interface Express (PCIe) interface configured to control PCIe transactions over a PCIe bus, the PCIe interface configured to issue PCIe transactions to directly access data buffers in a plurality of processors connected to the PCIe bus;

a Non-Volatile Memory Express (NVMe) interface configured to process NVMe commands received on the PCIe bus to access the non-volatile memory;

means for determining latencies of the PCIe transactions that directly access the data buffers in the plurality of processors, the PCIe transactions that directly access the data buffers comprise data payload transactions; and means for regulating data transfers across the PCIe bus for the NVMe commands based on the latencies of the PCIe transactions that directly access the data buffers in the plurality of processors.

16. The non-volatile memory system of claim 15, wherein the means for regulating data transfers across the PCIe bus for the NVMe commands based on the latencies of the PCIe transactions that directly access the data buffers in the plurality of processors is configured to:

estimate costs of accessing the data buffers associated with the NVMe commands based on the latencies of the PCIe transactions that directly access the data buffers in the plurality of processors; and schedule the NVMe commands based on the estimated costs.

17. The non-volatile memory system of claim 15, further comprising means for determining latencies of PCIe control transactions that directly access NVMe Input/Output (I/O) queues or physical region page (PRP) lists in memory of the plurality of processors connected to the PCIe bus; and wherein the means for regulating data transfers across the PCIe bus for the NVMe commands is further for scheduling the NVMe commands based on the latencies of the PCIe control transactions.

18. The non-volatile memory system of claim 15, wherein the means for determining latencies of the PCIe transactions that directly access the data buffers in the plurality of processors is configured to:

determine latencies of PCIe transactions that directly access data buffers in a central processing unit (CPU); and determine latencies of PCIe transactions that directly access data buffers in a graphics processing unit (GPU).

19. The non-volatile memory system of claim 15, wherein the means for regulating data transfers across the PCIe bus for the NVMe commands based on the latencies of the PCIe transactions that directly access the data buffers in the plurality of processors is configured to:

schedule PCI transactions that directly access the data buffers in a first processor of the plurality of processors.

* * * * *